(12) United States Patent
Tiwari et al.

(10) Patent No.: US 11,348,357 B1
(45) Date of Patent: May 31, 2022

(54) FINGERPRINT SENSOR CONFIGURED FOR AVOIDANCE OF LATENT FINGERPRINTS

(71) Applicant: QUALCOMM Incorporated, San Diego, CA (US)

(72) Inventors: Prakash Tiwari, Hyderabad (IN); Suzana Arellano, San Diego, CA (US); Naga Chandan Babu Gudivada, Hyderabad (IN); Rakesh Pallerla, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/248,267

(22) Filed: Jan. 15, 2021

(51) Int. Cl.
| | |
|---|---|
| G06V 40/13 | (2022.01) |
| G06F 21/32 | (2013.01) |
| G06F 3/041 | (2006.01) |
| G06F 3/044 | (2006.01) |

(52) U.S. Cl.
CPC .......... *G06V 40/1306* (2022.01); *G06F 3/044* (2013.01); *G06F 3/0412* (2013.01); *G06F 3/0416* (2013.01); *G06F 21/32* (2013.01)

(58) Field of Classification Search
CPC ..... G06K 9/0002; G06F 21/32; G06F 3/0416; G06F 3/0412; G06F 3/044; G06V 40/1306
See application file for complete search history.

(56) References Cited

U.S. PATENT DOCUMENTS

| | | | |
|---|---|---|---|
| 6,535,622 B1* | 3/2003 | Russo ................ | G06K 9/00013 340/5.83 |
| 11,010,589 B1* | 5/2021 | Russo ................ | G06K 9/00899 |
| 2018/0314870 A1* | 11/2018 | Yang ..................... | G06F 3/0412 |
| 2020/0092411 A1* | 3/2020 | Xu ...................... | G06K 9/00087 |
| 2020/0184191 A1* | 6/2020 | Thompson ........... | G06K 9/0004 |
| 2020/0234031 A1* | 7/2020 | De Foras ........... | G06K 9/00013 |

* cited by examiner

*Primary Examiner* — Premal R Patel
(74) *Attorney, Agent, or Firm* — Qualcomm Incorporated

(57) ABSTRACT

A method may include prompting a user to place their finger within a given sub-region of a fingerprint sensing surface and then obtaining the user's fingerprint. The given sub-region may be selected based on a determined or estimated probability that the given sub-region contains a latent fingerprint. As examples, the given sub-region may be determined randomly, pseudo-randomly, or based on information in a log of historical touch and/or fingerprint locations. The method may further involve tracking which sub-regions of the fingerprint sensing surface may potentially have latent fingerprints. The method may involve prompting the user to wipe one or more sub-regions of the fingerprint sensing surface when more than a predetermined fraction of the fingerprint-sensing surface has been used to obtain fingerprint images.

20 Claims, 13 Drawing Sheets

FINGERPRINT SENSOR CONFIGURED FOR AVOIDANCE OF LATENT FINGERPRINTS

TECHNICAL FIELD

This disclosure relates generally to fingerprint sensors and methods for using such systems.

DESCRIPTION OF THE RELATED TECHNOLOGY

Fingerprint sensors including ultrasonic and other types of fingerprint sensors have been included in devices such as smartphones, cash machines and cars to authenticate a user. Although some existing fingerprint sensors can provide satisfactory performance, improved fingerprint sensors would be desirable. In particular, existing fingerprint sensors are susceptible to false positive authentication due to latent fingerprints (i.e., a fingerprint, of an authorized user, left on a surface by deposits of oils and other materials). As an example, existing fingerprint sensors can be tricked into accepting a latent fingerprint as a valid fingerprint, even when no actual finger is present.

SUMMARY

The systems, methods and devices of the disclosure each have several innovative aspects, no single one of which is solely responsible for the desirable attributes disclosed herein.

One innovative aspect of the subject matter described in this disclosure may be implemented in an apparatus. The apparatus may, in some examples, include a display, a fingerprint sensor and a control system. In some examples, the fingerprint sensor may have a fingerprint-sensing surface having a plurality of sub-regions. The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof.

In some examples, the control system may be configured to prompt, via at least one visual notification on the display, a user to place their finger within a given sub-region of the plurality of sub-regions of the fingerprint-sensing surface. In some examples, the control system may be configured to obtain, using the fingerprint sensor, a fingerprint of the user from the given sub-region of the fingerprint-sensing surface. In some implementations, the control system may be configured to randomly or pseudo-randomly select the given sub-region from the plurality of sub-regions of the fingerprint-sensing surface.

According to some examples, the control system may be configured to obtain a log of historical fingerprint locations. Each historical fingerprint location may, for example, indicate a location or area within the fingerprint-sensing surface at which a respective previous fingerprint image was obtained since a reset operation. In some examples, the control system may be configured to identify, based on the log, the given sub-region of the fingerprint-sensing surface. In some instances, the log may indicate that no previous fingerprint images were obtained since the reset operation from within the given sub-region.

In some examples, the control system may be configured to determine, based on the log, that more than a predetermined fraction of the fingerprint-sensing surface has been used to obtain fingerprint images since the reset operation. According to some examples, the control system may be configured to perform the reset operation, based on the determination, by prompting, via one or more visual notifications on the display, a user to wipe at least some portion of the fingerprint-sensing surface. In some implementations, the control system may be configured to add the given sub-region to the log of historical fingerprint locations.

According to some examples, the fingerprint sensor may have touch sensor functionality and/or the apparatus also may include a touch sensor. According to some such examples, the control system may be configured to obtain a log of historical touch locations, each historical touch location indicating a location or area within the fingerprint-sensing surface at which a respective previous touch input was received by the fingerprint sensor and/or the touch sensor since a reset operation. In some such examples, the control system may be configured to identify, based on the log, the given sub-region of the fingerprint-sensing surface. In some such examples, the log may indicate that no previous touch inputs were obtained since the reset operation from within the given sub-region.

According to some examples, the control system may be configured to identify a first location or first area of the fingerprint-sensing surface. The first location or first area may be associated with an ending location or ending area for at least one previous fingerprint image. The control system may be configured to prompt the user to place their finger within the given sub-region by prompting the user, via at least one visual notification on the display, to slide at least one finger across the first location or first area and end the slide of the at least one finger at a second location or second area distinct from the first location or first area.

Other innovative aspects of the subject matter described in this disclosure may be implemented via apparatus. The apparatus may, in some examples, include a display, a fingerprint sensor and a control system. In some examples, the fingerprint sensor may have a fingerprint-sensing surface. The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof.

In some examples, the control system may be configured to obtain a log of historical fingerprint locations, each historical fingerprint location indicating a location or area within the fingerprint-sensing surface at which a respective previous fingerprint image was obtained since a reset operation. In some such examples, the control system may be configured to determine, based on the log, that more than a predetermined fraction of the fingerprint-sensing surface has been used to obtain fingerprint images since the reset operation. According some such examples, the control system may be configured to perform the reset operation, based on the determination, by prompting, via one or more visual notifications on the display, a user to wipe the fingerprint-sensing surface.

According to some examples, the fingerprint sensor may have touch sensor functionality and/or the apparatus may include a touch sensor. In some such examples, the control system may be configured to obtain a log of historical touch locations. In some instances, each historical touch location may indicate a location or area within the fingerprint-sensing surface at which a respective previous touch input was received by the fingerprint sensor and/or the touch sensor since the reset operation. In some such examples, the control system may be configured to determine, based on the log, that more than a predetermined fraction of the fingerprint-sensing surface has been used to receive at least one touch input since the reset operation. In some such examples, the control system may be configured to perform the reset operation, based on the determination, by prompting, via one or more visual notifications on the display, the user to wipe the fingerprint-sensing surface.

In some examples, the control system may be configured to prompt, via at least one visual notification on the display, a user to place their finger within a given sub-region of the plurality of sub-regions of the fingerprint-sensing surface. In some such examples, the control system may be configured to obtain, using the fingerprint sensor, a fingerprint of the user from the given sub-region of the fingerprint-sensing surface.

Some innovative aspects of the subject matter described in this disclosure may be implemented via one or more methods. One such method involves prompting, using at least one visual notification on a display, a user to place their finger within a given sub-region of a plurality of sub-regions of a fingerprint-sensing surface. In some examples, the method involves obtaining, using a fingerprint sensor associated with the fingerprint-sensing surface, a fingerprint of the user from the given sub-region of the fingerprint-sensing surface. According to some examples, the method may involve randomly or psuedo-randomly selecting the given sub-region from the plurality of sub-regions of the fingerprint-sensing surface.

According to some examples, the method may involve obtaining a log of historical fingerprint locations. Each historical fingerprint location may, for example, indicate a location or area within the fingerprint-sensing surface at which a respective previous fingerprint image was obtained since a reset operation. In some examples, the method may involve selecting, based on the log, the given sub-region of the fingerprint-sensing surface. The log may, in some instances, indicate that no previous fingerprint images were obtained since the reset operation from within the given sub-region. In some examples, the method may involve determining, based on the log, that more than a predetermined fraction of the fingerprint-sensing surface has been used to obtain fingerprint images since the reset operation. In some such examples, the method may involve performing the reset operation, based on the determination, by prompting, via one or more visual notifications on the display, a user to wipe at least some portion of the fingerprint-sensing surface. In some examples, the method may involve adding the given sub-region to the log of historical fingerprint locations.

In some examples, the method may involve obtaining a log of historical touch locations. In some such examples, each historical touch location may indicate a location or area within the fingerprint-sensing surface at which a respective previous touch input was received by the fingerprint sensor and/or by a touch sensor since a reset operation. In some such examples, the method may involve identifying, based on the log, the given sub-region of the fingerprint-sensing surface. In some instances, the log may indicate that no previous touch inputs were obtained since the reset operation from within the given sub-region.

According to some examples, the method may involve identifying a first location or first area of the fingerprint-sensing surface. The first location or first area may be associated with an ending location or ending area for at least one previous fingerprint image. Prompting the user to place their finger within the given sub-region may involve prompting the user, via at least one visual notification on the display, to slide at least one finger across the first location or first area and end the slide of the at least one finger at a second location or second area distinct from the first location or first area.

Some or all of the operations, functions and/or methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented via one or more non-transitory media having software stored thereon.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale. Like reference numbers and designations in the various drawings indicate like elements.

DETAILED DESCRIPTION

Figure 1A:
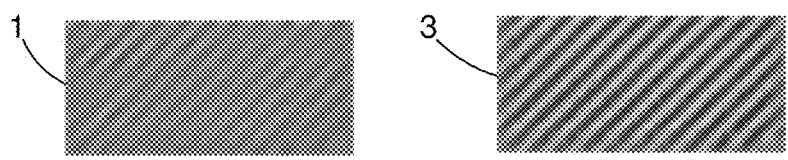
FIG. 1A shows examples of latent and live fingerprint images obtained by an ultrasonic fingerprint sensor.

The following description is directed to certain implementations for the purposes of describing the innovative aspects of this disclosure. However, a person having ordinary skill in the art will readily recognize that the teachings herein may be applied in a multitude of different ways. The described implementations may be implemented in any device, apparatus, or system that includes a biometric system as disclosed herein. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, armbands, wristbands, rings, headbands, patches, etc., Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), mobile health devices, computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, automatic teller machines (ATMs), parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also may be used in applications such as, but not limited to, electronic switching devices, radio frequency filters, sensors, accelerometers, gyroscopes, motion-sensing devices, magnetometers, inertial components for consumer electronics, parts of consumer electronics products, automobile doors, steering wheels or other automobile parts, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

Latent fingerprints (i.e., residue patterned by a finger) on a fingerprint sensor surface are a common occurrence. In certain situations, a latent fingerprint can have sufficient ridge-valley definition and sufficient contrast that, when scanned by a fingerprint sensor, the latent fingerprint is erroneously accepted as being from an authorized finger. In other words, a fingerprint sensor may be susceptible to false positive matches when a latent fingerprint is left by an authorized user and the fingerprint sensor is later triggered. (As used herein, the term "finger" can refer to any digit, including a thumb. Accordingly, the term "fingerprint" as used herein may refer to a print from any digit, including a thumb.)

In some implementations, an apparatus may include a display, a fingerprint sensor and a control system. According to some examples, the apparatus may be configured for prompting, via at least one visual notification on the display, a user to place their finger within a given sub-region of the fingerprint sensor and then obtain a fingerprint from the resulting finger touch within the given sub-region. The given sub-region may be selected by the apparatus in a manner than reduces or eliminates the likelihood of there being a latent fingerprint (i.e., residue patterned by a finger) within the given sub-region, thereby reducing or eliminating the susceptibility of the apparatus to false positive matches due to a latent fingerprint left by an authorized user. As examples, the apparatus may select the given sub-region randomly, pseudo-randomly, based on one or more logs of historical fingerprint locations, and based on one or more logs of historical touch locations (e.g., touch inputs received by the fingerprint sensor and/or a touch sensor within the apparatus). The control system may be further configured to manage one or more logs of historical fingerprint locations (and/or touch locations) by, as examples, adding the locations of new fingerprints, adding the locations of new touch inputs, removing one or more locations after receiving indication that those locations have been wiped (e.g., after receiving a touch input that slides across a location), and removing one or more locations after a reset operation (e.g., after instructing a user to wipe residual material from one or more locations). In some examples, the control system may be configured to prompt a user to wipe one or more regions of a fingerprint sensor surface, and such prompting may be triggered by, as an example, a determination that more than a predetermined fraction of the fingerprint sensor surface is potentially covered by latent fingerprints.

Particular implementations of the subject matter described in this disclosure may be implemented to realize one or more of the following potential advantages. According to some examples, the fingerprint sensor may be able to obtain fingerprints in a manner that avoids latent fingerprints, thereby improving security. As an example, the locations with the fingerprint sensor at which previous fingerprints were obtained may be avoided when obtaining a new fingerprint. As another example, an apparatus may track the locations at which previous fingerprints were obtained and may prompt a user to clean latent fingerprints from those locations. The fingerprint sensor may therefore be less susceptible to security attacks that rely upon latent fingerprints deposited on the fingerprint sensor surface.

FIG. 1A shows examples of a latent and live fingerprint images obtained by an ultrasonic fingerprint sensor. Image 1 is an image of a latent fingerprint (i.e., residue imprinted with the patterns of a finger) and image 3 is an image of a live fingerprint (i.e., a finger) captured by an ultrasonic fingerprint sensor. Image 1 may also be referred to as an air image, as image 1 was captured with no object such as a finger on or near the surface of the ultrasonic fingerprint sensor. In contrast, image 3 was captured with a finger on or near the surface of the ultrasonic fingerprint sensor. The surface of the fingerprint sensor may, as an example, include the platen 425 of FIG. 4A and/or platen 40 of FIGS. 5A, 5B, and 5C.

In these examples, image 1 and image 3 correspond to the same portion of the same finger. Image 3 was obtained when the finger was touching the surface of the fingerprint sensor, while image 1 was obtained after the finger was removed from the surface of the fingerprint sensor. As can be seen from FIG. 1A, image 1 closely matches image 3. As a result, there is a risk that the ultrasonic fingerprint sensor could falsely authenticate image 1 and thus falsely unlock a device or otherwise authenticate a user, despite the fact that the user did not provide a live finger for scanning at the time of capturing image 1.

Figure 1B:
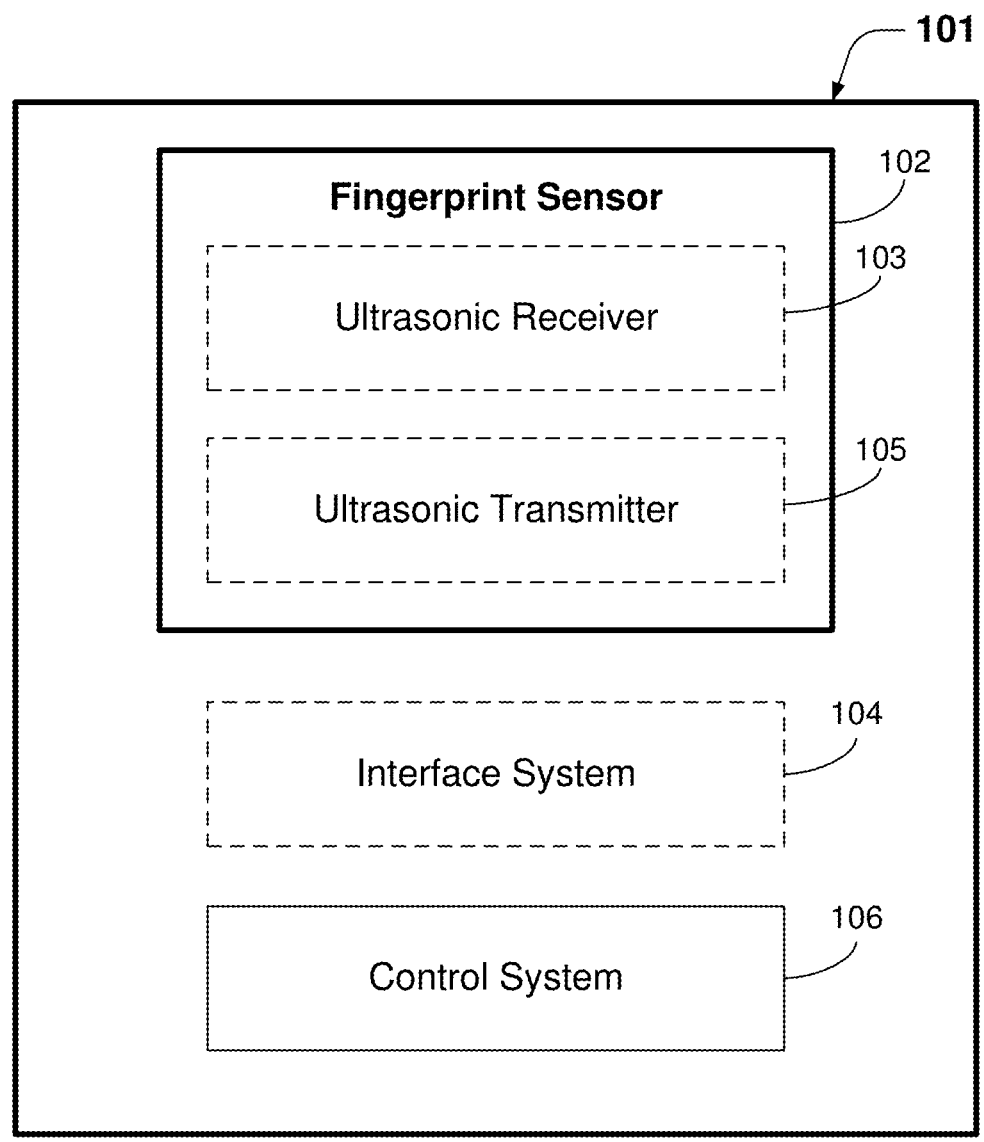
FIG. 1B is a block diagram that shows example components of an apparatus according to some disclosed implementations.

FIG. 1B is a block diagram that shows example components of an apparatus according to some disclosed implementations. In this example, the apparatus 101 includes an fingerprint sensor 102 and a control system 106. Some implementations of the apparatus 101 may include an interface system 104.

The fingerprint sensor 102 may be any desired type of fingerprint sensor including, but not limited to, an ultrasonic fingerprint sensor, an optical fingerprint sensor, a capacitive fingerprint sensor, a CMOS fingerprint sensor, and a thermal fingerprint sensor. In some examples, the fingerprint sensor 102 is formed from a combination of sensor types (e.g., two or more of ultrasonic, optical, capacitive, CMOS, and thermal fingerprint sensing technologies). It should be understood that portions of this disclosure referring to ultrasonic fingerprint sensors, or any other specific type of fingerprint sensors, are not limited to ultrasonic fingerprint sensor technologies, or whatever specific technology is referenced. The present disclosure is broadly applicable to fingerprint sensors and is not specific to ultrasonic fingerprint sensors, or any other specific type of fingerprint sensors. As a specific example, optical fingerprint sensors may have similar vulnerabilities to latent fingerprints as ultrasonic fingerprint sensors and the techniques described herein may be similarly applicable to optical fingerprint sensors.

In some examples, as suggested by the dashed lines within the fingerprint sensor 102, the fingerprint sensor 102 may be implemented as an ultrasonic fingerprint sensor that includes an ultrasonic receiver 103 and a separate ultrasonic transmitter 105. In some such examples, the ultrasonic transmitter 105 may include an ultrasonic plane-wave generator, such as those described below.

However, various examples of fingerprint sensors 102 are disclosed herein, some of which may include a separate ultrasonic transmitter 105 and some of which may not. Although shown as separate elements in FIG. 1B, in some implementations the ultrasonic receiver 103 and the ultrasonic transmitter 105 may be combined in an ultrasonic transceiver system. For example, in some implementations, the fingerprint sensor 102 may be an ultrasonic sensor and may include a piezoelectric receiver layer, such as a layer of polyvinylidene fluoride PVDF polymer or a layer of polyvinylidene fluoride-trifluoroethylene (PVDF-TrFE) copolymer. In some implementations, a separate piezoelectric layer may serve as the ultrasonic transmitter. In some implementations, a single piezoelectric layer may serve as both a transmitter and a receiver. In some implementations that include a piezoelectric layer, other piezoelectric materials may be used in the piezoelectric layer, such as aluminum nitride (AlN) or lead zirconate titanate (PZT). The fingerprint sensor 102 may, in some examples, include an array of ultrasonic transducer elements, such as an array of piezoelectric micromachined ultrasonic transducers (PMUTs), an array of capacitive micromachined ultrasonic transducers (CMUTs), etc. In some such examples, PMUT elements in a single-layer array of PMUTs or CMUT elements in a single-layer array of CMUTs may be used as ultrasonic transmitters as well as ultrasonic receivers.

In an ultrasonic sensor system, an ultrasonic transmitter may be used to send an ultrasonic wave through an ultrasonically transmissive medium or media and towards an object to be detected. The transmitter may be operatively coupled with an ultrasonic sensor configured to detect portions of the ultrasonic wave that are reflected from the object. For example, in ultrasonic fingerprint imagers, an ultrasonic pulse may be produced by starting and stopping the transmitter during a very short interval of time. At each material interface encountered by the ultrasonic pulse, a portion of the ultrasonic pulse is reflected.

For example, in the context of an ultrasonic fingerprint imager, the ultrasonic wave may travel through a platen on which a person's finger may be placed to obtain a fingerprint image. After passing through the platen, some portions of the ultrasonic wave encounter skin that is in contact with the platen, e.g., fingerprint ridges, while other portions of the ultrasonic wave encounter air, e.g., valleys between adjacent ridges of a fingerprint, and may be reflected with different intensities back towards the ultrasonic sensor. The reflected signals associated with the finger may be processed and converted to a digital value representing the signal strength of the reflected signal. When multiple such reflected signals are collected over a distributed area, the digital values of such signals may be used to produce a graphical display of the signal strength over the distributed area, for example by converting the digital values to an image, thereby producing an image of the fingerprint. Thus, an ultrasonic sensor system may be used as a fingerprint imager or other type of biometric scanner. In some implementations, the detected signal strength may be mapped into a contour map of the finger that is representative of the depth of the ridge structure detail.

The control system 106 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. According to some examples, the control system 106 may include a dedicated component for controlling the ultrasonic fingerprint sensor 102. The control system 106 also may include (and/or be configured for communication with) one or more memory devices, such as one or more random access memory (RAM) devices, read-only memory (ROM) devices, etc. Accordingly, the apparatus 101 may have a memory system that includes one or more memory devices, though the memory system is not shown in FIG. 1B. The control system 106 may be configured for receiving and processing data from the ultrasonic fingerprint sensor 102, e.g., from the ultrasonic receiver 103. If the apparatus 101 includes a separate ultrasonic transmitter 105, the control system 106 may be configured for controlling the ultrasonic transmitter 105, e.g., as disclosed elsewhere herein. In some implementations, functionality of the control system 106 may be partitioned between one or more controllers or processors, such as between a dedicated sensor controller and an applications processor of a mobile device. Some examples are described below.

Some implementations of the apparatus 101 may include an interface system 104. In some examples, the interface system 104 may include a wireless interface system. In some implementations, the interface system 104 may include a user interface system, one or more network interfaces, one or more interfaces between the control system 106 and a memory system, and/or one or more interfaces between the control system 106 and one or more external device interfaces (e.g., ports or applications processors). The user interface may include, as examples, a display, a speaker, an audio port, a video port, a touch pad, a touch screen, and buttons.

The interface system 104 may be configured to provide communication (which may include wired or wireless communication, such as electrical communication, radio communication, etc.) between components of the apparatus 101. In some such examples, the interface system 104 may be configured to provide communication between the control system 106 and the ultrasonic fingerprint sensor 102. According to some such examples, the interface system 104 may couple at least a portion of the control system 106 to the ultrasonic fingerprint sensor 102, e.g., via electrically conducting material (e.g., via conductive metal wires or traces). If the apparatus 101 includes an ultrasonic transmitter 105 that is separate from the ultrasonic receiver 103, the interface system 104 may be configured to provide communication between at least a portion of the control system 106 and the ultrasonic transmitter 105. According to some examples, the interface system 104 may be configured to provide communication between the apparatus 101 and other devices and/or human beings. In some such examples, the interface system 104 may include one or more user interfaces. The interface system 104 may, in some examples, include one or more network interfaces and/or one or more external device interfaces (such as one or more universal serial bus (USB) interfaces or a serial peripheral interface (SPI)). In some implementations, the apparatus 101 may include a memory system. The interface system 104 may, in some examples, include at least one interface between the control system 106 and a memory system.

The apparatus 101 may be used in a variety of different contexts, some examples of which are disclosed herein. For example, in some implementations a mobile device may include at least a portion of the apparatus 101. In some implementations, a wearable device may include at least a portion of the apparatus 101. The wearable device may, for example, be a bracelet, an armband, a wristband, a ring, a headband or a patch. In some implementations, the control system 106 may reside in more than one device. For example, a portion of the control system 106 may reside in a wearable device and another portion of the control system 106 may reside in another device, such as a mobile device (e.g., a smartphone). The interface system 104 also may, in some such examples, reside in more than one device.

FIGS. 2A, 2B, 2C, and 2D are flow diagrams that provides example blocks of some methods disclosed herein. The blocks of FIGS. 2A, 2B, 2C, and 2D may, for example, be performed by the apparatus 101 of FIG. 1B or by a similar apparatus. As with other methods disclosed herein, the method 200 outlined in FIG. 2A, the method 220 outlined in FIG. 2B, the method 240 outlined in FIG. 2C, and the method 260 outlined in FIG. 2D may include more or fewer blocks than indicated. Moreover, the blocks of methods disclosed herein are not necessarily performed in the order indicated. In some examples, some blocks of methods disclosed herein may be performed concurrently.

Figure 2A:
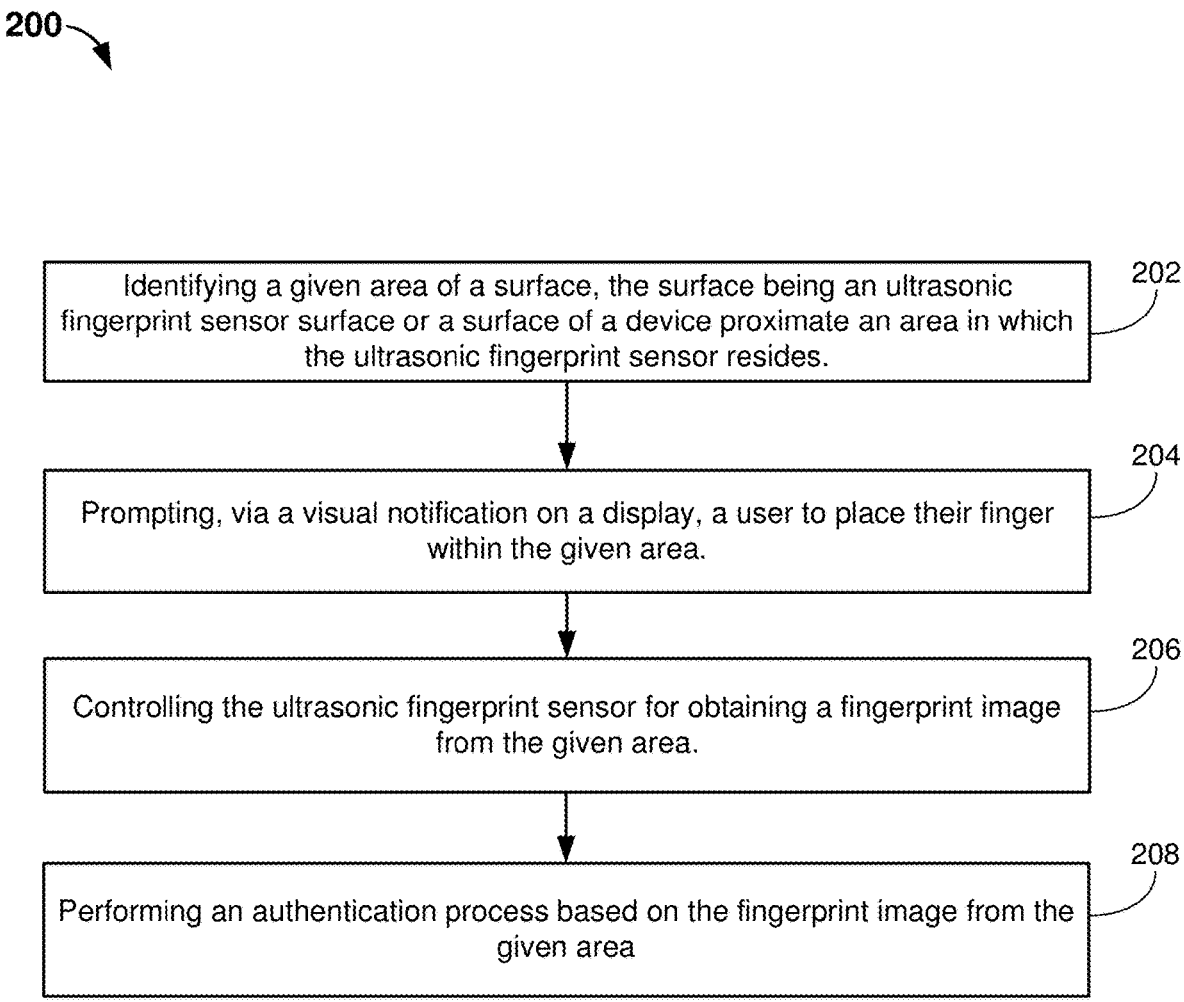
FIGS. 2A, 2B, 2C, and 2D are flow diagrams that provide example blocks of some methods disclosed herein.

According to the example of FIG. 2A, the method 200 is a method of controlling an apparatus that includes a fingerprint sensor. According to this implementation, block 202 involves identifying (e.g., via a control system of the apparatus, such as the control system 106 of the apparatus 101 that is shown in FIG. 1B) a given area of a surface, the surface being an ultrasonic fingerprint sensor surface or a surface of a device proximate an area in which the fingerprint sensor resides. The given area may be an area selected in a manner that reduces, or eliminates, the probability of having a latent fingerprint imprinted upon the selected area. As examples, the given area may be identified using any desired technique including, but not limited to random selection, pseudo-random selection, algorithmic selection, and selection based on a log (e.g., a log indicative of the likely presence of latent fingerprints). Given usage patterns of certain devices, random and/or pseudo-random selection may provide a desirable reduction in security risks from latent fingerprints. Similarly, a log of historical fingerprint and/or touch locations can be used to avoid areas that may have latent fingerprints, thereby providing a desirable reduction in security risks from latent fingerprints.

In this implementation, block 204 involves prompting, via one or more visual notifications on a display, a user to place their finger within the given area identified in block 202. As an example, block 204 may involve presenting the user with a visual indication, such as marker 342 of GUI 300d of FIG. 3A, that they should place their finger within the given area identified in block 202. As additional examples, block 204 may involve prompting a user to locate their finger within the given area with haptic feedback, with audio feedback, and/or with any desired combination of haptic, audio, visual, and other feedback. If desired, the user may be prompted to locate their finger within the given area without visual prompting (e.g., by appropriate audio commands and feedback such as a command to touch the screen and then subsequent commands to move up, right, down, left, of the like until the user's finger is in the given area, by appropriate haptic feedback, etc.).

In some embodiments, orientation may be considered as part of blocks 202 and 204, and as part of the corresponding blocks in the other methods described herein. As an example, block 202 may involve identifying a given orientation (in addition to or instead of a given location), where the given orientation may be selected to reduce the likelihood of a latent fingerprint interfering with proper authentication and block 204 may involve prompting the user to orientate their finger into the given orientation. In such embodiments, the apparatus may maintain logs of the orientation of historical fingerprint locations and/or touch inputs as part of identifying the given orientation.

In some embodiments, the fingerprint sensor surface (or surface proximate an area in which a fingerprint sensor resides) may be divided into any desired number of regions of common or varying size. In such embodiments, block 202 may involve selecting a given one of the regions. As a particular example, the fingerprint sensor surface may be divided into an array of 4 by 6 regions, where each region is a possible region for fingerprint authentication.

In this implementation, block 206 involves controlling (e.g., via a control system of the apparatus, such as the control system 106 of the apparatus 101 that is shown in FIG. 1B) the fingerprint sensor for obtaining a fingerprint image of the user's finger (also referred to as a target object) from the given area identified in block 202. In some examples, such as when the fingerprint sensor is implemented with an ultrasonic fingerprint sensor, block 206 may involve transmission of first ultrasonic waves toward the target object. Additionally, block 206 may involve controlling the ultrasonic fingerprint sensor to transmit ultrasonic waves in the range of 1 MHz to 30 MHz. For example, an ultrasonic transmitter of the ultrasonic fingerprint sensor may be controlled for transmission of the first ultrasonic waves. Furthermore, block 206 may involve receiving first ultrasonic receiver signals from the ultrasonic fingerprint sensor. The first ultrasonic receiver signals include signals corresponding to reflections of the first ultrasonic waves from the target object.

According to some examples, the apparatus may include a touch sensor system. In some such examples, a previous process of the method 200 may have involved determining, by a control system, a target object position based on one or more signals received from the touch sensor system. Block 206 may, in some such examples, involve controlling the fingerprint sensor according to the digit position. However, in some alternative examples, the control system may be configured for determining a digit position based on one or more signals received from the fingerprint sensor.

In this implementation, block 208 involves performing an authentication process based, at least in part, on the fingerprint image obtained in block 206. In some instances, block 206 may involve obtaining fingerprint image data and block 208 may involve authenticating the fingerprint image data. As used herein, the term "fingerprint image data" may refer generally to data obtained from, or data based on signals obtained from, an ultrasonic receiver or data obtained from a fingerprint sensor utilizing another technology. In some instances, the fingerprint image data may correspond, at least in part, to a target object such as a finger that may include a fingerprint. The fingerprint image data may or may not be presented in a form that is recognizable to a human being as being an image. For example, the fingerprint image data may be, or may include, a data structure in which numerical values are arranged and/or stored. The numerical values may, in some examples, correspond to signals received from an ultrasonic fingerprint sensor, an optical sensor system, a capacitive sensor system, etc. In some examples, the fingerprint image data may correspond to signals received from a sensor system during a time window. In some instances, the fingerprint image data may correspond to signals received from a particular area, such as a fingerprint contact area.

In some examples, block 208 may involve extracting features from the ultrasonic receiver signals or the fingerprint sensor. The authentication process may be based, at least in part, on the features. According to some examples, the features may be fingerprint features, such as the locations, orientations and/or types of fingerprint minutiae. In some such examples, the fingerprint image data may include indications of one or more fingerprint features detected in at least a portion of the signals from the sensor system (such as an ultrasonic fingerprint sensor). The fingerprint features may include one or more fingerprint ridge features and one or more fingerprint valley features. The fingerprint features may, for example, be detected by a control system such as the control system 106 of FIG. 1B.

In ultrasonic systems, signals indicating fingerprint ridge features may generally be obtained from sensor pixels of the ultrasonic fingerprint sensor that are responding to ultrasonic waves that have been reflected from platen/fingerprint ridge interfaces. Signals indicating fingerprint valley features may generally be obtained from sensor pixels that are responding to ultrasonic waves that have been reflected from platen/ fingerprint valley interfaces. The reflections from a platen/ fingerprint valley interface will generally be reflections from a platen/air interface, whereas the reflections from a platen/ fingerprint ridge interface will generally be reflections from a platen/skin interface, corresponding to areas in which fingerprint ridges are in contact with a platen. Because a platen/fingerprint valley interface will generally have a much higher acoustic impedance contrast than a platen/ fingerprint ridge interface, a platen/fingerprint valley interface will generally produce relatively higher-amplitude reflections.

Figure 2B:
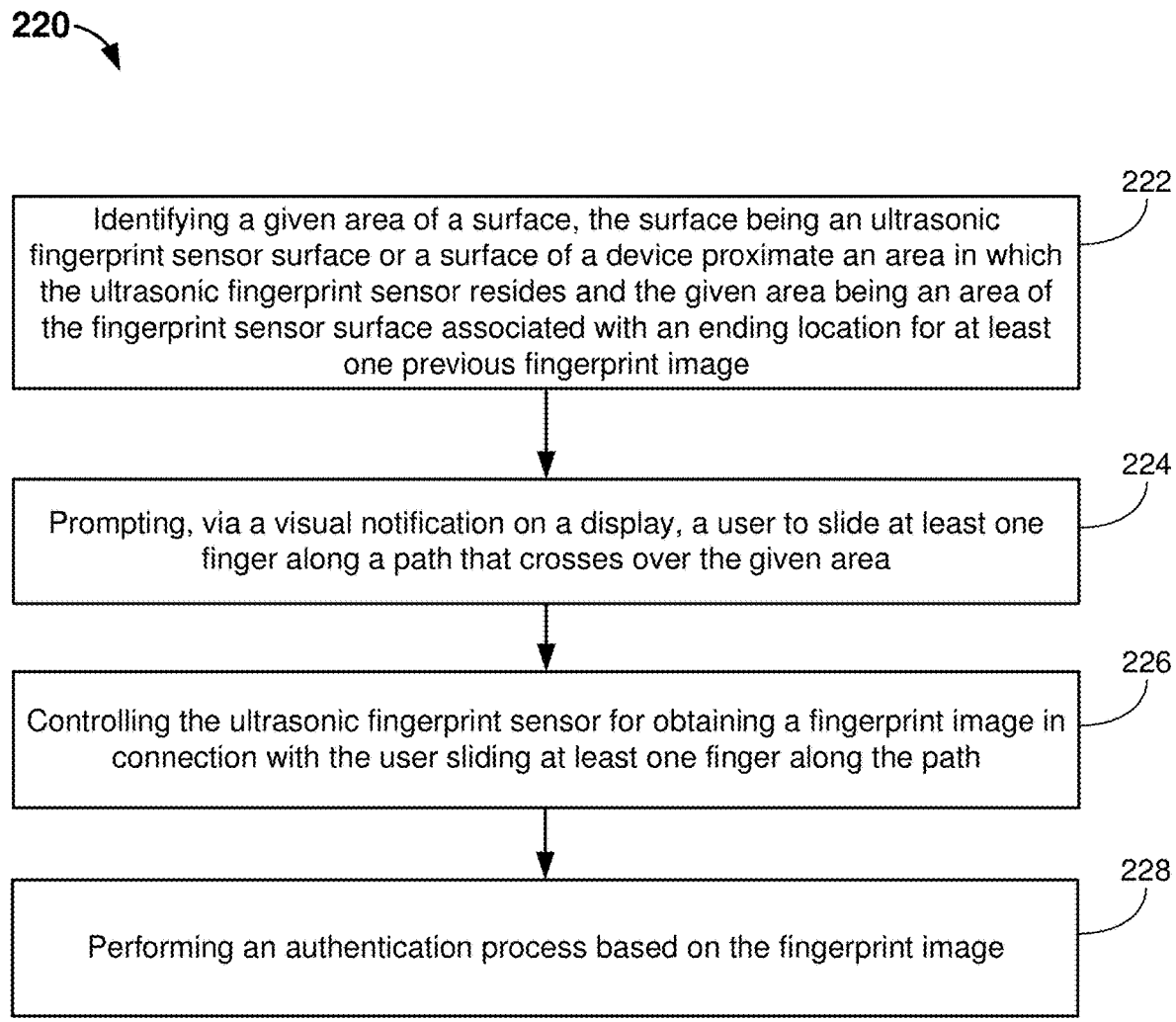

According to the example of FIG. 2B, the method 220 is a method of controlling an apparatus that includes a fingerprint sensor. According to this implementation, block 222 involves identifying a given area of a surface, the surface being an ultrasonic fingerprint sensor surface or a surface of a device proximate an area in which the fingerprint sensor resides. Identifying the given area may involve identifying the ending location(s) for at least one previous fingerprint image (e.g., identifying locations on the surface that may have latent fingerprints).

In this implementation, block 224 involves prompting, via one or more visual notifications on a display, a user to slide at least one of their fingers along a path that crosses over the given area identified in block 222.

Figure 3A:
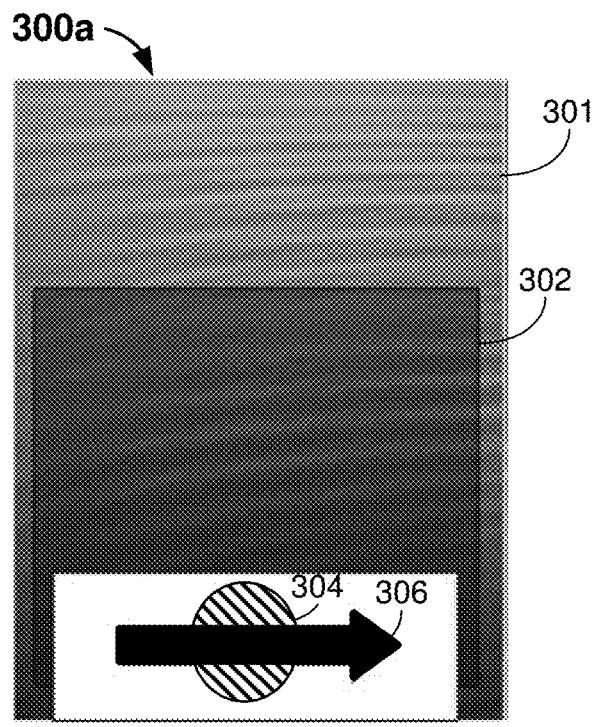
FIGS. 3A and 3B show examples of graphical user interfaces associated with avoiding latent fingerprints.
Figure 3A:
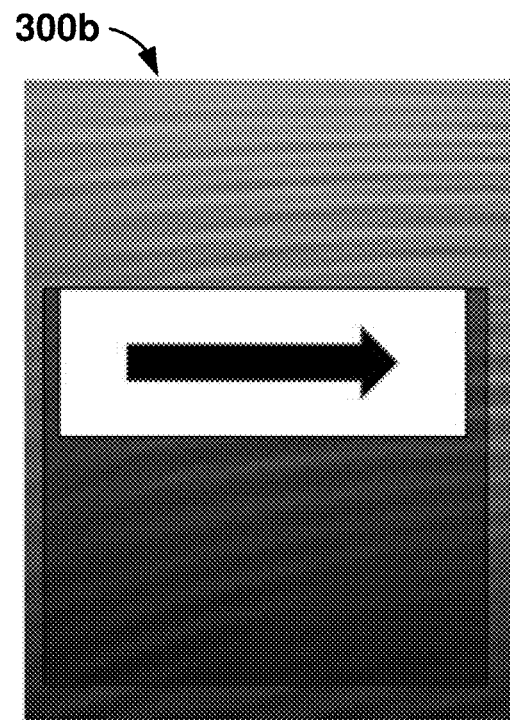
Figure 3A:
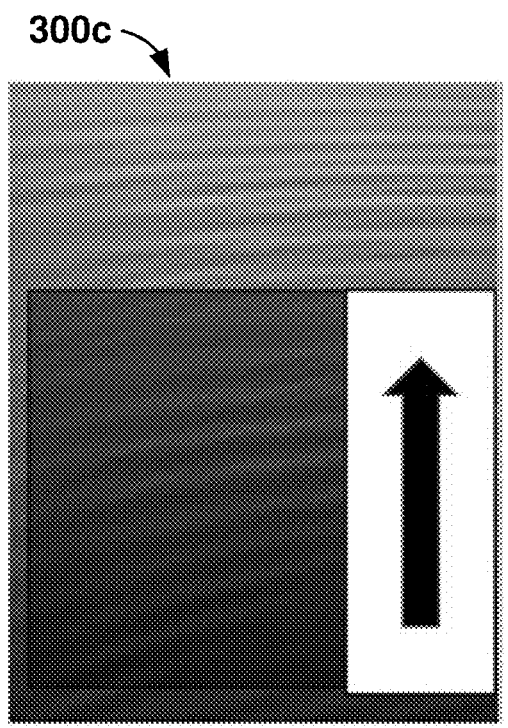
Figure 3A:
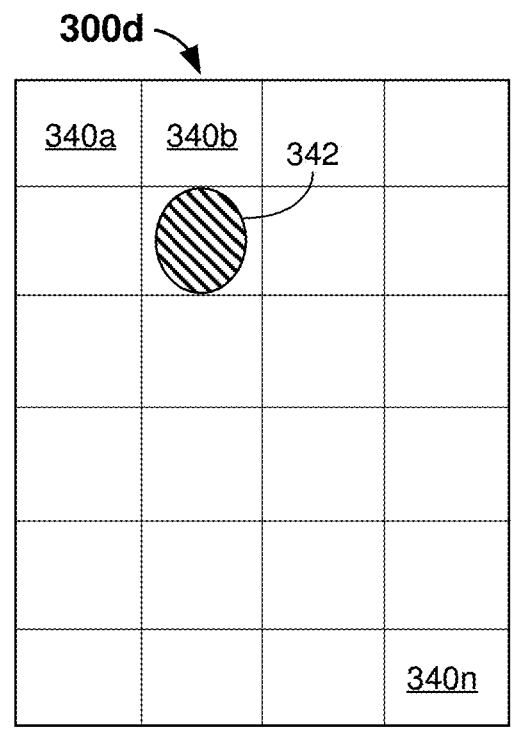

As an example, block 224 may involve presenting the user with a visual indication, such as arrow 306 of GUI 300*a* of FIG. 3A (which crosses over the ending location 304 for at least one previous fingerprint image), that they should slide their finger along a path (e.g., the arrow itself representing the path) that crosses over the given area identified in block 222. As additional examples, block 224 may involve prompting a user to locate and slide their finger (across the given area) with haptic feedback, with audio feedback, and/or with any desired combination of haptic, audio, visual, and other feedback. If desired, the user may be prompted to locate and slide their finger (across the given area) without visual prompting (e.g., by appropriate audio commands and feedback such as a command to touch the screen and then subsequent commands to move up, right, down, left, of the like until the user's finger completes the desire motion, etc.). In general, the apparatus may prompt the user to move their finger across the surface in any suitable pattern and need not be limited to single-direction sliding motions. As examples, the user may be asked to fill in a shape, follow a path that meanders or otherwise changes direction at least once, draw a letter, number, or other character, etc. It may be desirable, however, to prompt the user to move their finger in a manner that causes the user to rub or wipe one or more regions believed to be at risk for having latent fingerprints (such locations being determined through the techniques disclosed herein, including use of logs), where such wiping or rubbing action is believed to reduce the security risks posed by latent fingerprints.

In this implementation, block 226 involves controlling (e.g., via a control system of the apparatus, such as the control system 106 of the apparatus 101 that is shown in FIG. 1B) the fingerprint sensor for obtaining a fingerprint image of the user's finger (also referred to as a target object) during and/or after the user slides their finger(s) along the path that crosses over the area identified in block 222. In some examples, such as when the fingerprint sensor is implemented with an ultrasonic fingerprint sensor, block 226 may involve transmission of first ultrasonic waves toward the target object and may involve receiving first ultrasonic receiver signals from the ultrasonic fingerprint sensor. The first ultrasonic receiver signals include signals corresponding to reflections of the first ultrasonic waves from a target object such as the user's finer(s).

In this implementation, block 228 involves an authentication process based, at least in part, on the fingerprint image and/or fingerprint image data obtained in block 226.

Figure 2C:
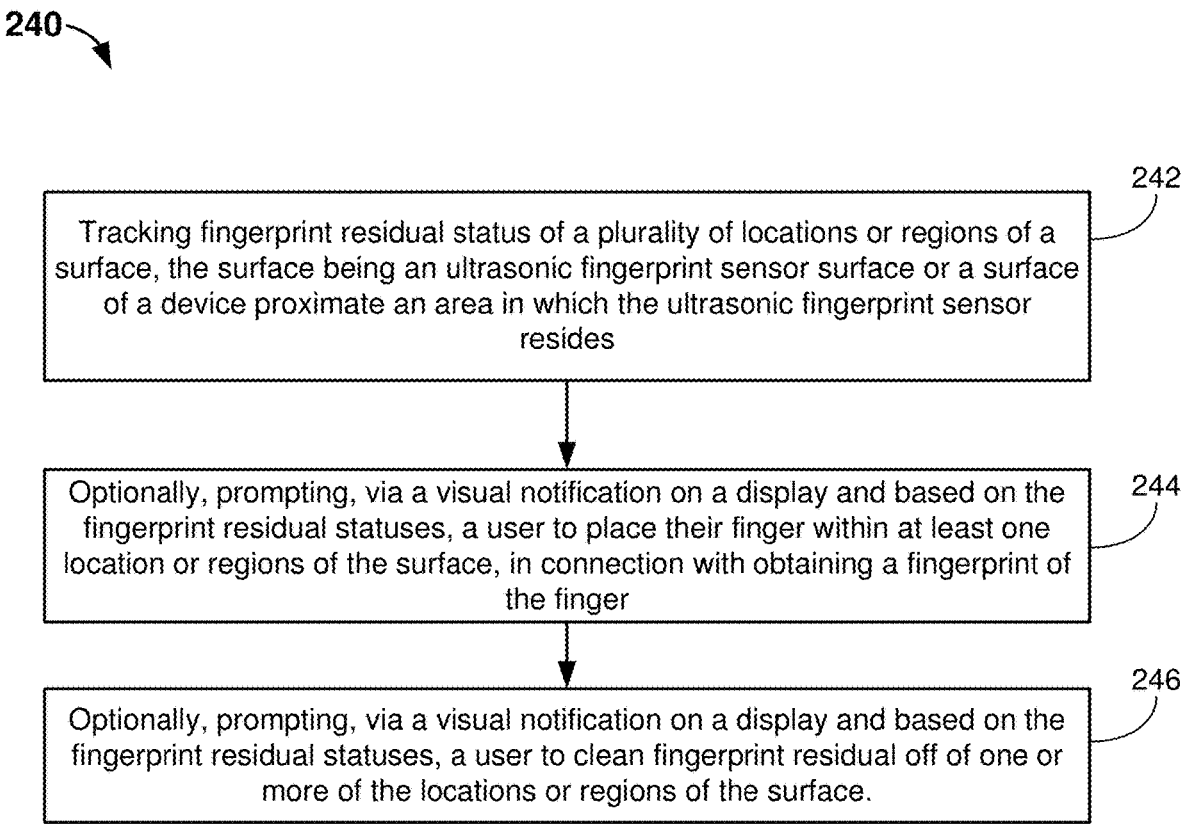

According to the example of FIG. 2C, the method 240 is a method of controlling an apparatus that includes a fingerprint sensor. According to this implementation, block 242 involves tracking the fingerprint residual status of a plurality of locations or regions of a surface, the surface being an ultrasonic fingerprint sensor surface or a surface of a device proximate an area in which the ultrasonic fingerprint sensor resides. In some examples, block 242 involves maintaining one or more logs of the locations or areas potentially having latent fingerprints, such as locations or areas used in obtaining fingerprints and touch input locations. As an example, block 242 may involve logging the locations or areas at which new fingerprints are received and/or classifying such locations or areas as potentially containing a latent fingerprint. Block 242 may also or alternatively involve logging the locations or areas at which new touch inputs are received and/or classifying such locations or areas as potentially containing a latent fingerprint. In some implementations, block 242 may also involve tracking activities, such as sliding touch inputs and user's responses to prompts to wipe one or more locations, that tend to remove latent fingerprints. In such examples, block 242 may involve removing locations where latent fingerprints are likely to have been removed from one or more logs and/or classifying such locations as likely free of latent fingerprints. In some embodiments, the apparatus may be configured such that fingerprint residual status fades over time in some manner. In other words, it may sometimes be assumed that latent fingerprints fade over time (due to use, drying out, etc.) and therefore additional security benefit can be achieved even if the apparatus only avoids the locations of "fresh" historical fingerprints when collecting new fingerprints.

In optional block 244, the apparatus may prompt a user, e.g., via a visual notification on a display and based on the fingerprint residual statuses, to place their finger (or multiple fingers) within at least one location or region in connection with obtaining a fingerprint. The location or region may be selected in a manner that reduces or eliminates the probability of having a latent fingerprint in the selected location or region. Additional details and examples of such operations and functionality are described in connection with block 204 of FIG. 2A and block 224 of FIG. 2B.

In optional block 246, the apparatus may prompt a user, e.g., via a visual notification on a display and based on the fingerprint residual statuses, to clean fingerprint residual off of one or more locations or regions of the surface. The areas or regions that are selected for cleaning may be the locations or regions believed to potentially have latent fingerprints, as determined by the tracking in block 232.

Figure 2D:
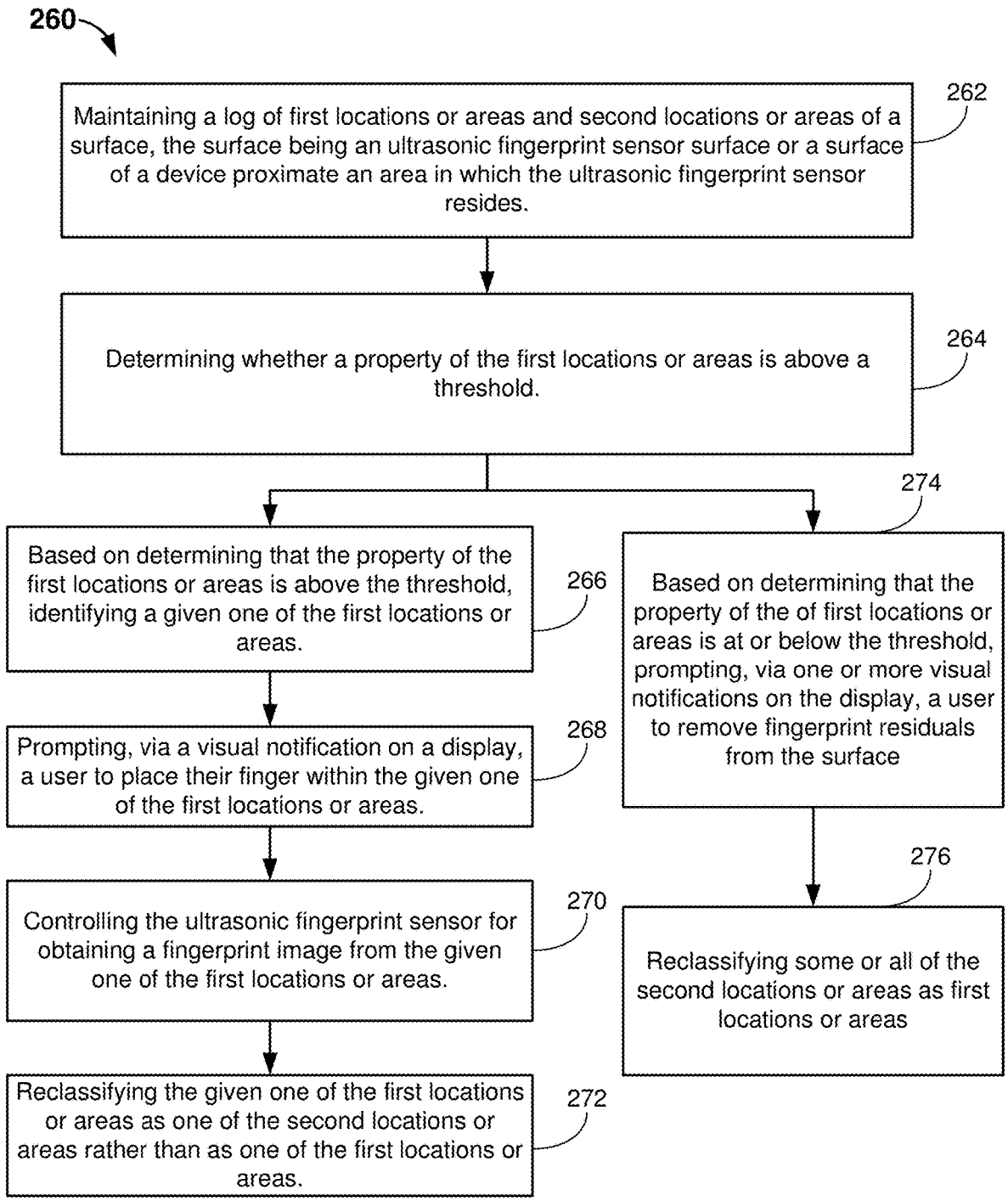

According to the example of FIG. 2D, the method 240 is a method of controlling an apparatus that includes a fingerprint sensor. According to this implementation, block 262 involves tracking the fingerprint residual status of a plurality of locations or regions of a surface, the surface being an ultrasonic fingerprint sensor surface or a surface of a device proximate an area in which the ultrasonic fingerprint sensor resides. In the implementation of FIG. 2D, block 262 may involve classifying each location or region of a fingerprint-sensing surface as either a first location or area that's believed to be free of latent fingerprints or as a second location or area that's believed to be at risk of containing one or more latent fingerprints. In some examples, block 262 involves maintaining one or more logs of the locations or areas potentially having latent fingerprints, such as locations or areas used in obtaining fingerprints and touch input locations. As an example, block 262 may involve logging the locations or areas at which new fingerprints are received and/or classifying such locations or areas as potentially containing a latent fingerprint. Block 262 may also or alternatively involve logging the locations or areas at which new touch inputs are received and/or classifying such locations or areas as potentially containing a latent fingerprint. In some implementations, block 262 may also involve tracking activities, such as sliding touch inputs and user's responses to prompts to wipe one or more locations, that tend to remove latent fingerprints. In such examples, block 262 may involve removing locations where latent fingerprints are likely to have been removed from one or more logs and/or classifying such locations as likely free of latent fingerprints.

In this implementation, block 264 involves determining whether a property of the first locations or areas (e.g., the locations or areas believed to be free of latent fingerprints) is above a threshold. As an example, block 264 may involve determining if the first locations or areas have a combined area over the fingerprint sensor surface area that exceeds a threshold such as about 20%, about 30%, about 40%, about 50%, about 60%, about 70%, about 80%, or greater than about 80% of the total surface area of the fingerprint sensor surface area. As another example, block 264 may involve determining if the number of first locations or areas is greater than a threshold, which may be as low as zero. In some embodiments, multiple properties and respective thresholds may be utilized in block 264 (e.g., to determine whether to proceed to block 266 or to block 274). For example, block 264 may involve determining whether there are more than a certain number of first locations or areas and also determining whether the combined area of the first locations or areas is greater than a certain fraction of the total surface area of the fingerprint sensor surface area.

In this implementation, block 266 may be performed when the property of the first locations or areas is above a threshold (which may indicate that enough of the fingerprint sensor surface areas is believed to be free of latent fingerprints to proceed with a fingerprint authentication attempt). Block 266 involves identifying a given one of the first locations or areas (e.g., regions believed to be free of latent fingerprints). Selection of the given location or area from the set of first locations or areas may be done according to any of the techniques described herein in connection with blocks 202, 222, and 244 of FIGS. 2A, 2B, and 2C, as examples.

In this implementation, blocks 268 and 270 involve prompting a user to place their finger within the given location or area identified in block 266 and controlling the fingerprint sensor for obtaining a fingerprint image from the given location or area. Block 268 may correspond to block 204 of FIG. 2A and block 224 of FIG. 2B and the prompting of block 268 may be done according to any of the techniques described herein in connection with block 204 of FIG. 2A and block 224 of FIG. 2B. Similarly, block 270 may correspond to block 206 of FIG. 2A and block 226 of FIG. 2B and the controlling of block 270 may be done according to any of the techniques described herein in connection with block 206 of FIG. 2A and block 226 of FIG. 2B. While not shown in FIG. 2D, it should be understood that an authentication process, which may be done according to any of the techniques described herein in connection with block 208 of FIG. 2A and block 228 of FIG. 2B, may be performed subsequent to block 270.

In this implementation, block 272 involves reclassifying the given one of the first locations or areas as one of the second locations or areas. In particular, since the given one of the first locations or areas was used in receiving a fingerprint (as part of blocks 268 and 270), the given first location or areas identified in block 266 may now have a latent fingerprint. Thus, block 272 may involve updating the log maintained in block 262 to reflect that the given first location or area identified in block 266 may now have a latent fingerprint.

In this implementation, block 274 may be performed when the property of the first locations or areas is at or below a threshold (which may indicate that not enough of the fingerprint sensor surface areas is believed to be free of latent fingerprints to proceed with a fingerprint authentication attempt). Block 274 involves prompting a user, via one or more visual notifications on the display, to remove fingerprint residuals from the fingerprint sensing surface. As examples, the user may be asked to fill in a shape with their finger or other object, trace their finger or other object over path that meanders or otherwise changes direction at least once, draw a letter, number, or other character, etc. It may be desirable to prompt the user to move their finger in a manner that causes the user to rub or wipe one or more regions (e.g., the first locations or areas of FIG. 2D) believed to be at risk for having latent fingerprints (such locations being determined through the techniques disclosed herein, including use of logs), where such wiping or rubbing action is believed to remove and/or sufficiently distort any latent fingerprints to reduce any security risks posed by such latent fingerprints. The specific pattern(s) that are provided in the prompt of block 274 may be selected based on which portions of the fingerprint sensor surface are believed to potentially contain latent fingerprints. As an example, the prompt may include a meandering path that crosses over each location or region believed to potentially contain latent fingerprints. As another example, a given prompt out of a plurality of available prompts may be selected, after determining that the given prompt would cross over (e.g., wipe) more of the locations or regions believed to potentially contain latent fingerprints than any of the other available prompts.

In this implementation, block 276 involves reclassifying some or all of the second locations or areas (e.g., locations or areas believed to be at risk for containing a latent fingerprint) as first locations or areas (e.g., locations or areas believed to be free of latent fingerprints), based on the cleaning or wiping of the user that was prompted in block 274. As an example, block 276 involves reclassifying each of the locations or areas that the user was prompted to clean or wipe in block 274. In some implementations, block 276 may involve verifying that a user has actually cleaned or wiped the locations or areas prompted in block 274. As an example, block 276 may involve verifying that a user has wiped one or more particular locations using input from a touch sensor (via touch sensor functionality of the fingerprint sensor itself or via a separate touch sensor) to confirm that the user has actually pressed their finger(s) or an object against the fingerprint sensor surface at the desired location (s) and/or has actually slid their finger(s) or an object across the desired location(s).

Referring again to FIGS. 2A, 2B, 2C, and 2D, in some implementations methods 200, 220, 240, and/or 260 may involve performing an anti-spoofing process. According to some implementations, methods 200, 220, 240, and 260 may involve additional processes that depend on the outcome of one or more of the authentication processes of blocks 200, 220, 240, and 260 and/or the anti-spoofing process, if any. For example, if the authentication process and/or the anti-spoofing process (if any) conclude successfully, a control system may allow access to a device and/or to a secure area. In some such instances, a control system may unlock a mobile device, a laptop computer, a door, an automobile, or another device.

FIG. 3A shows examples of graphical user interfaces (GUIs) for providing prompts to users to slide their finger(s) along a desired path and/or place their finger(s) at a desired location as part of obtaining a fingerprint and avoiding latent fingerprints. As shown in GUIs 300a, 300b, and 300c, the apparatus described herein may include a display area 301 and may include a fingerprint sensing surface 302. In the example of FIG. 3A, the fingerprint sensing surface 302 overlaps with more than half of the display area 301. It should be appreciated that the fingerprint sensing surface 302 may overlap more of less of the display area 301 than shown in FIG. 3A. In some examples, the fingerprint sensing surface 302 overlaps substantially all of the display area 301 (e.g., any region of the display area 301 can also be used in obtaining a fingerprint image). In general, increasing the overlap of the fingerprint sensing surface 302 (e.g., increasing the size of the fingerprint sensing surface) can improve user experience and improve the ability of the system to avoid potential latent fingerprints.

As shown by GUIs 300a, 300b, and 300c, the apparatus described herein may prompt a user to slide their finger along a desired path (such as described in connection with block 224 of FIG. 2B). In the example of GUI 300a, the desired path 306 extends across the location or area 304 at which at least one previous fingerprint was captured (and/or at which at least one previously touch input was received). The desired path may take any desired direction (e.g., up, down, left right, diagonal, etc.) and cover any desired portion of the display or fingerprint sensing surface (preferably, but necessarily always, at least ending on a location within the fingerprint sensing surface 302 to facilitate capture of a fingerprint). While GUIs 300a, 300b, and 300c illustrate a simple path with a single segment, more complicated paths with multiple non-parallel segments and/or curving or other non-linear segments may also be implemented. Thus, a user sliding their finger along the desired path 306 may effectively wipe any latent fingerprint at location 304, thereby reducing any security risks posed by such a latent fingerprint.

As shown by GUI 300d, the apparatus described herein may prompt a user to place their finger at a desired location (such as described in connection with block 204 of FIG. 2A, block 244 of FIG. 2C, and block 268 of FIG. 2D). In the example of GUI 300d, marker 342 is displayed to prompt a user to place their finger within the corresponding region. GUI 300d may depict only the fingerprint sensing surface. As shown by grid-lines in GUI 300d, the fingerprint sensing surface may be divided into regions 340a, 340b, . . . , 340n.

Figure 3B:
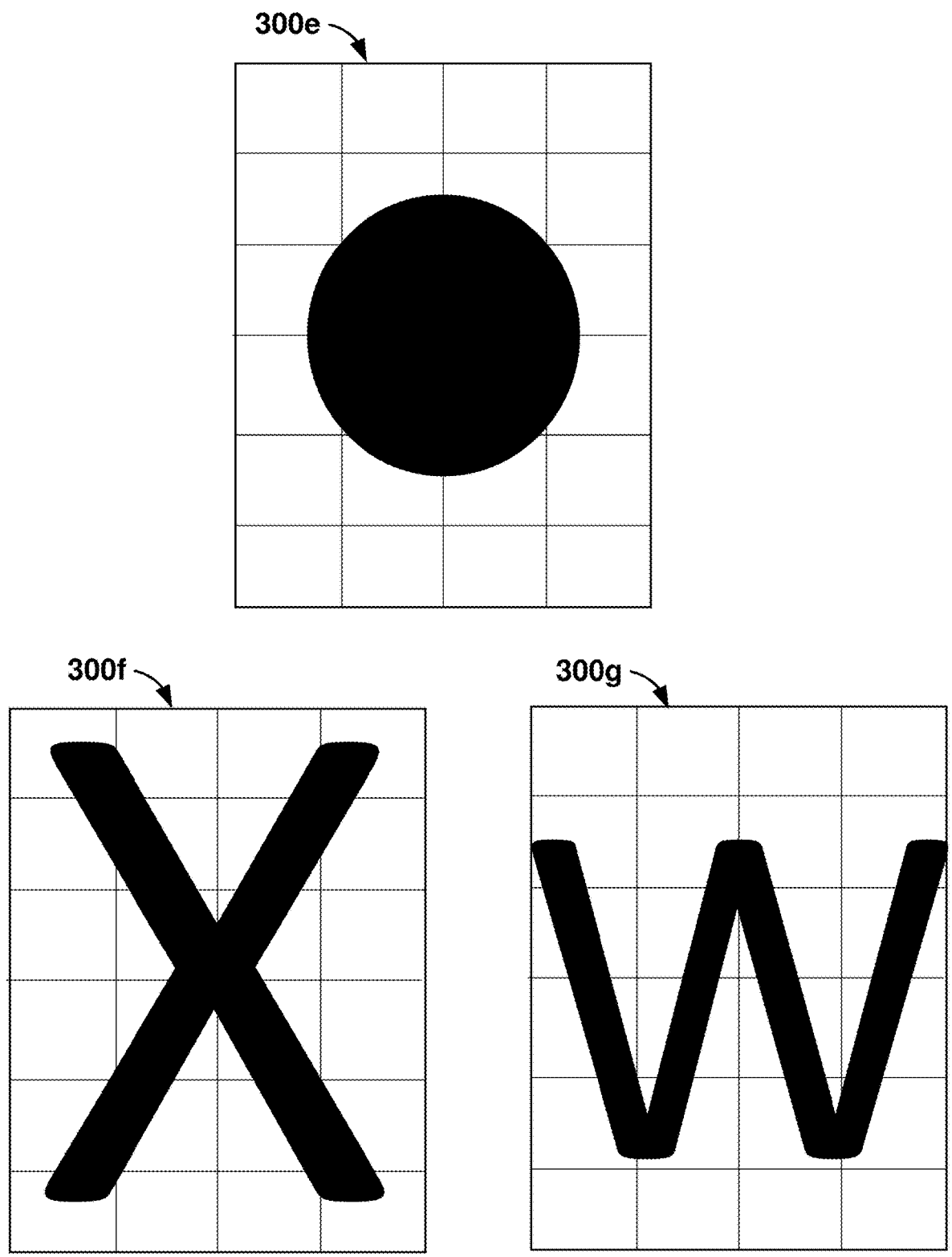

FIG. 3B shows example graphical user interfaces (GUIs) for providing prompts to users to wipe or otherwise clean the fingerprint sensing surface (e.g., as described in connection with block 246 of FIG. 2C and block 274 of FIG. 2D). In particular, GUI 300e shows a prompt whereby a user is requested to "fill in" a shape (e.g., by sliding their finger across each part of the shape including its interior), thereby wiping the associated regions of the fingerprint sensor surface. GUIs 300f and 300g show prompts whereby a user is requested to draw letters ("X" and "W") on the fingerprint sensor surface, thereby wiping the associated regions of the fingerprint sensor surface.

The GUIs of FIGS. 3A and 3B are merely illustrative examples.

Figure 4A:
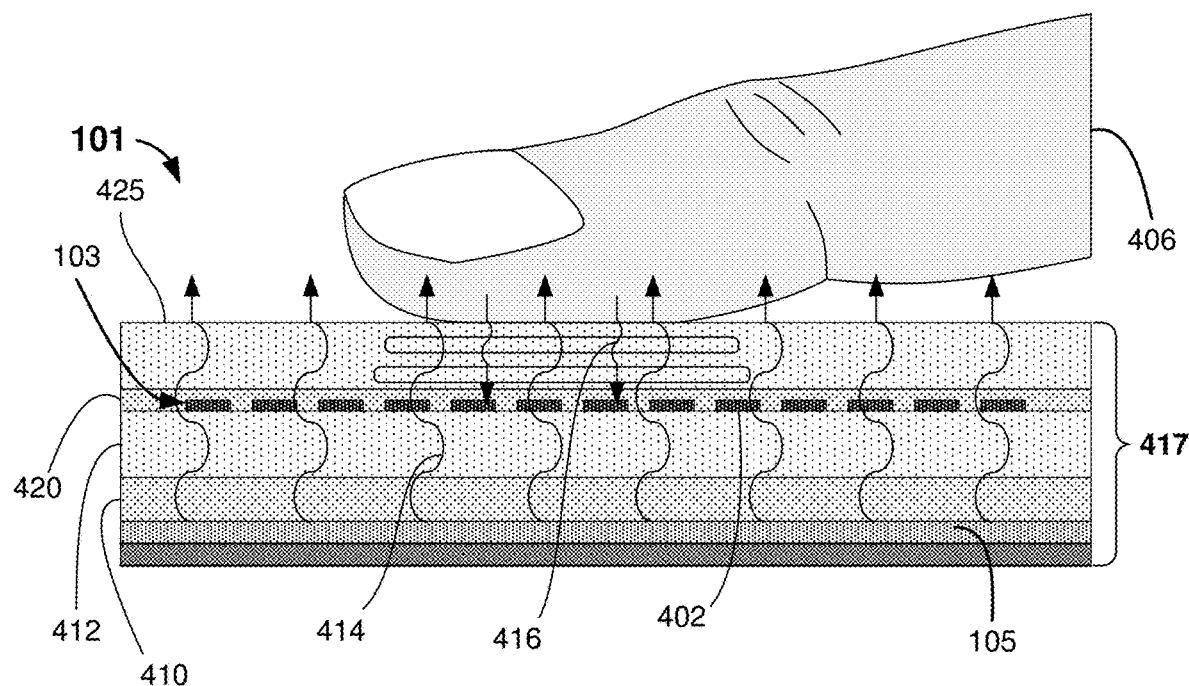
FIG. 4A shows an example of a cross-sectional view of an apparatus capable of performing at least some methods that are described herein.

FIG. 4A shows an example of a cross-sectional view of an apparatus capable of performing at least some methods that are described herein. For example, the apparatus 101 may be capable of performing the methods that are described herein with reference to FIGS. 2A, 2B, 2C, and 2D. Here, the apparatus 101 is an example of the apparatus 101 that is described above with reference to FIG. 1B. As with other implementations shown and described herein, the types of elements, the arrangement of the elements and the dimensions of the elements illustrated in FIG. 4A are merely shown by way of example.

FIG. 4A shows an example of ultrasonic waves reflecting from a target object. In this example, the target object is a finger 406 being insonified by transmitted ultrasonic waves 414. In this example, the transmitted ultrasonic waves 414 are instances of ultrasonic waves that may be transmitted as part of obtaining fingerprint images in block 206 of FIG. 2A, block 226 of FIG. 2B, and block 270 of FIG. 2D. Here, the reflected ultrasonic waves 416 that are received by at least a portion of the ultrasonic receiver 103 are instances of the reflections of ultrasonic waves that may be received as part of obtaining fingerprint images in block 206 of FIG. 2A, block 226 of FIG. 2B, and block 270 of FIG. 2D.

In this example, the ultrasonic waves are transmitted by an ultrasonic transmitter 105 that is separate from the ultrasonic receiver 103. In the example shown in FIG. 4A, at least a portion of the apparatus 101 includes an ultrasonic transmitter 105 that may function as a plane-wave ultrasonic transmitter. In some implementations, the ultrasonic transmitter 105 may include a piezoelectric transmitter layer with transmitter excitation electrodes disposed on each side of the piezoelectric transmitter layer.

In this example, the ultrasonic receiver 103 functions as an ultrasonic receiver array. In some such examples, the ultrasonic receiver 103 may include an array of pixel input electrodes and sensor pixels formed in part from TFT circuitry, an overlying piezoelectric receiver layer 420 of piezoelectric material such as PVDF or PVDF-TrFE, and an upper electrode layer positioned on the piezoelectric receiver layer, which will sometimes be referred to herein as a receiver bias electrode. Examples of suitable ultrasonic transmitters and ultrasonic receiver arrays are described below.

However, in alternative implementations, the ultrasonic receiver 103 and the ultrasonic transmitter 105 may be combined in an ultrasonic transceiver array. For example, in some implementations, the ultrasonic receiver 103 may include a piezoelectric receiver layer, such as a layer of PVDF polymer or a layer of PVDF-TrFE copolymer. In some implementations, a separate piezoelectric layer may serve as the ultrasonic transmitter. In some examples, a single piezoelectric layer may serve as the transmitter and as a receiver. In some implementations, other piezoelectric materials may be used in the piezoelectric layer, such as aluminum nitride (AlN) or lead zirconate titanate (PZT). The ultrasonic sensor 102 may, in some examples, include an array of ultrasonic transducer elements, such as an array of piezoelectric micromachined ultrasonic transducers (PMUTs), an array of capacitive micromachined ultrasonic transducers (CMUTs), etc. In some such examples, a piezoelectric receiver layer, PMUT elements in a single-layer array of PMUTs, or CMUT elements in a single-layer array of CMUTs, may be used as ultrasonic transmitters as well as ultrasonic receivers.

In this example, the transmitted ultrasonic waves 414 have been transmitted from the ultrasonic transmitter 105 through a sensor stack 417 and into an overlying finger 406. The various layers of the sensor stack 417 may, in some examples, include one or more substrates of glass or other material (such as plastic or sapphire) that is substantially transparent to visible light. In this example, the sensor stack 417 includes a substrate 410 to which a light source system (not shown) is coupled, which may be a backlight of a display according to some implementations. In alternative implementations, a light source system may be coupled to a front light. Accordingly, in some implementations a light source system may be configured for illuminating a display and the target object.

In this implementation, the substrate 410 is coupled to a thin-film transistor (TFT) substrate 412 for the ultrasonic receiver 103. According to this example, a piezoelectric receiver layer 420 overlies the sensor pixels 402 of the ultrasonic receiver 103 and a platen 425 overlies the piezoelectric receiver layer 420. Accordingly, in this example the apparatus 101 is capable of transmitting the ultrasonic waves 414 through one or more substrates of the sensor stack 417 that include the ultrasonic receiver 103 with substrate 412 and the platen 425 that may also be viewed as a substrate.

In some implementations, sensor pixels 402 may be transparent, partially transparent or substantially transparent, such that the apparatus 101 may be capable of transmitting light from a light source system through elements of the ultrasonic receiver 103. In some implementations, the ultrasonic receiver 103 and associated circuitry may be formed on or in a glass, plastic or silicon substrate.

Figure 4B:
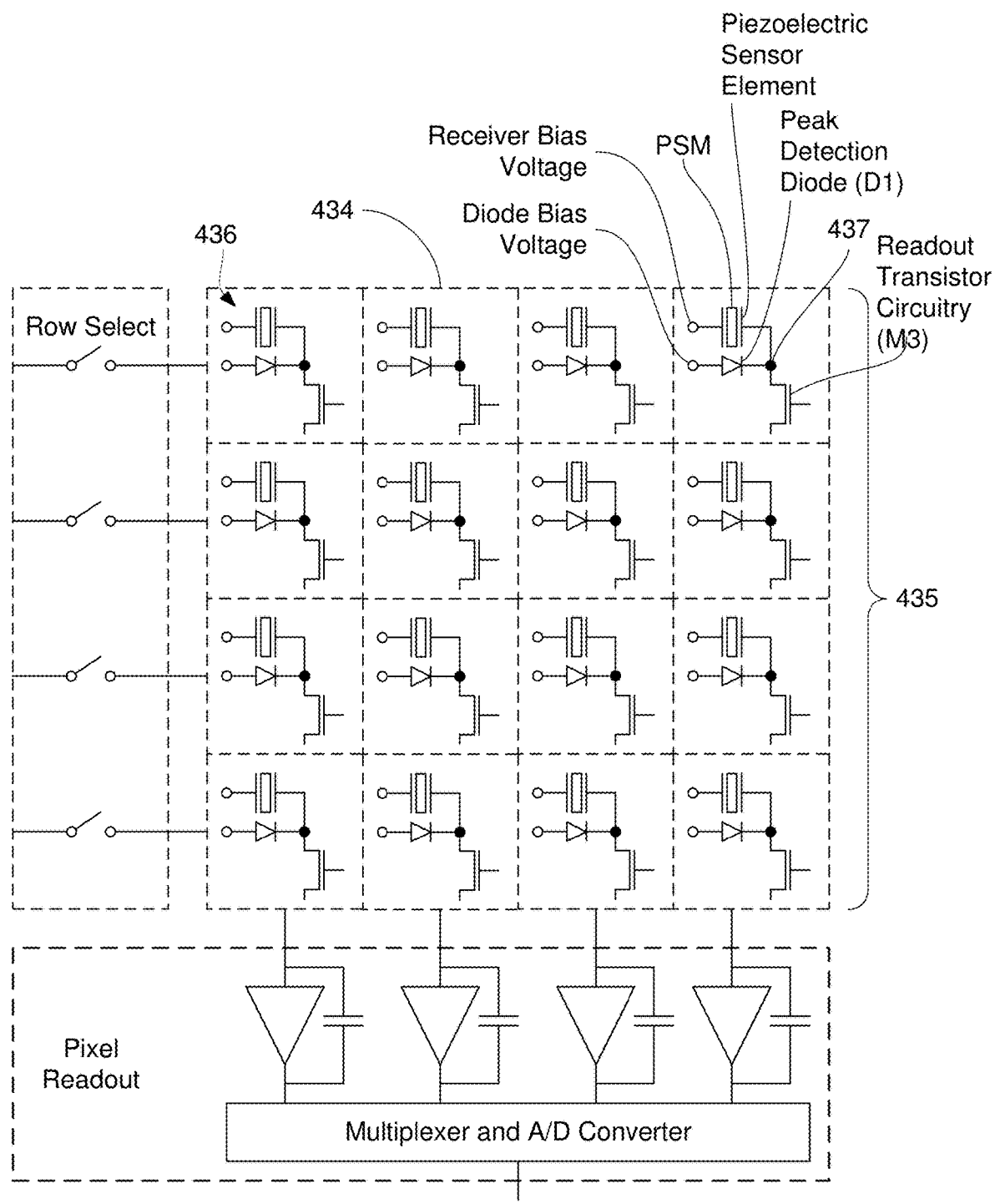
FIG. 4B representationally depicts aspects of a 4×4 pixel array of sensor pixels for an ultrasonic fingerprint sensor.

FIG. 4B representationally depicts aspects of a 4×4 pixel array of sensor pixels for an ultrasonic fingerprint sensor. Each sensor pixel 434 may be, for example, associated with a local region of piezoelectric sensor material (PSM), a pixel input electrode 437, a peak detection diode (D1) and a readout transistor circuitry (M3); many or all of these elements may be formed on or in a substrate to form the pixel circuit 436. In practice, the local region of piezoelectric sensor material of each sensor pixel 434 may transduce received ultrasonic energy into electrical charges. The peak detection diode D1 may register the maximum amount of charge detected by the local region of piezoelectric sensor material PSM. Each row of the pixel array 435 may then be scanned, e.g., through a row select mechanism, a gate driver, or a shift register, and the readout transistor circuitry M3 for each column may be triggered to allow the magnitude of the peak charge for each sensor pixel 434 to be read by additional circuitry, e.g., a multiplexer and an A/D converter. The pixel circuit 436 may include one or more TFTs to allow gating, addressing, and resetting of the sensor pixel 434.

Each pixel circuit 436 may provide information about a small portion of the object detected by the ultrasonic fingerprint sensor. While, for convenience of illustration, the example shown in FIG. 4B is of a relatively coarse resolution, ultrasonic sensors having a resolution on the order of 500 pixels per inch or higher may be configured with an appropriately scaled structure. The detection area of the ultrasonic fingerprint sensor may be selected depending on the intended object of detection. For example, the detection area may range from about 8 mm×3 mm, 5 mm×5 mm or 9 mm×4 mm for a single finger to about 3 inches×3 inches for four fingers. Smaller and larger areas, including square, rectangular and non-rectangular geometries, may be used as appropriate for the target object. If desired, the size of the ultrasonic fingerprint sensor may be larger than necessary for the intended objection of detection, as larger ultrasonic fingerprint sensors may have certain benefits (including an increased ability to avoid latent fingerprints under the techniques disclosed herein. As an example, the detection area may be about 3 inches×3 includes even when the intended object of detection is a single finger. As a specific example, the detection area may be selected depending on the intended usage of the implementing apparatus. As an example and when implemented in a mobile device, the detection area may be as large as a display area of the mobile device.

Figure 5A:
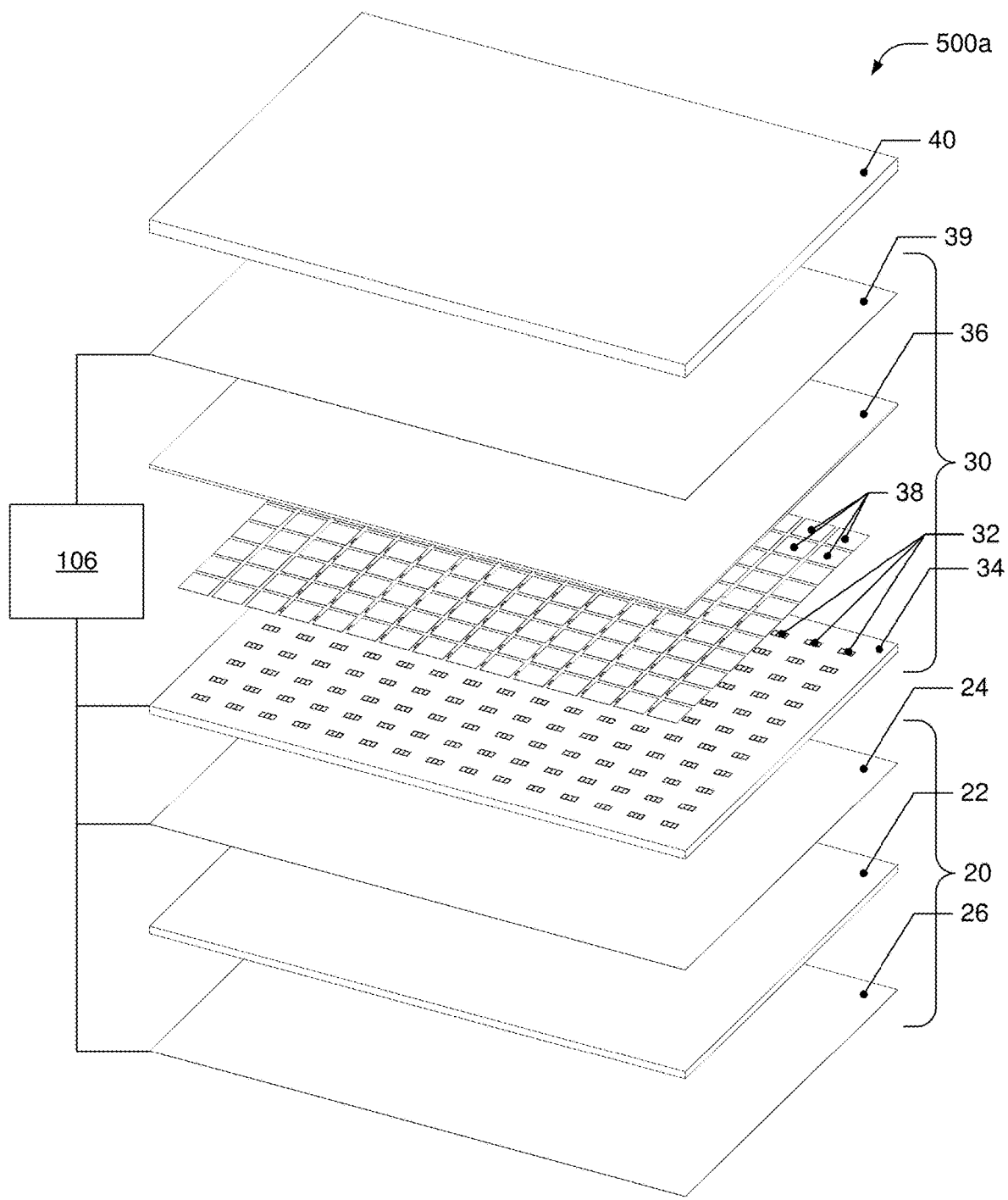
FIGS. 5A and 5B show example arrangements of ultrasonic transmitters and receivers in an ultrasonic fingerprint sensor, with other arrangements being possible.

FIG. 5A shows an example of an exploded view of an ultrasonic fingerprint sensor. In this example, the ultrasonic fingerprint sensor 500a includes an ultrasonic transmitter 20 and an ultrasonic receiver 30 under a platen 40. According to some implementations, the ultrasonic receiver 30 may be an example of the ultrasonic receiver 103 that is shown in FIG. 1B and described above. In some implementations, the ultrasonic transmitter 20 may be an example of the ultrasonic transmitter 105 that is shown in FIG. 1B and described above. The ultrasonic transmitter 20 may include a substantially planar piezoelectric transmitter layer 22 and may be configured for functioning as a plane wave generator. Ultrasonic waves may be generated by applying a voltage to the piezoelectric layer to expand or contract the layer, depending upon the signal applied, thereby generating a plane wave. In this example, the control system 106 may be configured for causing a voltage that may be applied to the planar piezoelectric transmitter layer 22 via a first transmitter electrode 24 and a second transmitter electrode 26. In this fashion, an ultrasonic wave may be made by changing the thickness of the layer via a piezoelectric effect. This generated ultrasonic wave may travel towards a finger (or other object to be detected), passing through the platen 40. A portion of the wave not absorbed or transmitted by the object to be detected may be reflected so as to pass back through the platen 40 and be received by the ultrasonic receiver 30. The first and second transmitter electrodes 24 and 26 may be metallized electrodes, for example, metal layers that coat opposing sides of the piezoelectric transmitter layer 22.

The ultrasonic receiver 30 may include an array of sensor pixel circuits 32 disposed on a substrate 34, which also may be referred to as a backplane, and a piezoelectric receiver layer 36. In some implementations, each sensor pixel circuit 32 may include one or more TFT- or silicon-based elements, electrical interconnect traces and, in some implementations, one or more additional circuit elements such as diodes, capacitors, and the like. Each sensor pixel circuit 32 may be configured to convert surface charge generated by the piezoelectric receiver layer 36 proximate to the pixel circuit into an electrical signal. Each sensor pixel circuit 32 may include a pixel input electrode 38 that electrically couples the piezoelectric receiver layer 36 to the sensor pixel circuit 32.

In the illustrated implementation, a receiver bias electrode 39 is disposed on a side of the piezoelectric receiver layer 36 proximal to platen 40. The receiver bias electrode 39 may be a metallized electrode and may be grounded or biased to control which signals may be passed to the array of sensor pixel circuits 32. Ultrasonic energy that is reflected from the exposed (top) surface of the platen 40 may be converted into surface charge by the piezoelectric receiver layer 36. The generated surface charge may be coupled to the pixel input electrodes 38 and underlying sensor pixel circuits 32. The charge signal may be amplified or buffered by the sensor pixel circuits 32 and provided to the control system 106.

The control system 106 may be electrically connected (directly or indirectly) with the first transmitter electrode 24 and the second transmitter electrode 26, as well as with the receiver bias electrode 39 and the sensor pixel circuits 32 on the substrate 34. In some implementations, the control system 106 may operate substantially as described above. For example, the control system 106 may be configured for processing the amplified signals received from the sensor pixel circuits 32.

The control system 106 may be configured for controlling the ultrasonic transmitter 20 and/or the ultrasonic receiver 30 to obtain ultrasonic data, which may include fingerprint data. According to some implementations, the control system 106 may be configured for providing functionality such as that described herein.

Whether or not the ultrasonic fingerprint sensor 500a includes a separate ultrasonic transmitter 20, in some implementations the control system 106 may be configured for obtaining attribute information from the ultrasonic data. In some examples, the control system 106 may be configured for controlling access to one or more devices based, at least in part, on the attribute information. The ultrasonic fingerprint sensor 500a (or an associated device) may include a memory system that includes one or more memory devices. In some implementations, the control system 106 may include at least a portion of the memory system. The control system 106 may be configured for obtaining attribute information from ultrasonic data and storing the attribute information in the memory system. In some implementations, the control system 106 may be configured for capturing a fingerprint image, obtaining attribute information from the fingerprint image and storing attribute information obtained from the fingerprint image (which may be referred to herein as fingerprint image information) in the memory system. According to some examples, the control system 106 may be configured for capturing a fingerprint image, obtaining attribute information from the fingerprint image and storing attribute information obtained from the fingerprint image even while maintaining the ultrasonic transmitter 20 in an "off" state.

In some implementations, the control system 106 may be configured for operating the ultrasonic fingerprint sensor 500a in an ultrasonic imaging mode and may be configured for controlling other devices, such as a display system, a communication system, etc. In some implementations, the control system 106 may be configured for operating the ultrasonic fingerprint sensor 500a in a capacitive imaging mode.

The platen 40 may be any appropriate material that can be acoustically coupled to the receiver, with examples including plastic, ceramic, sapphire, metal and glass. In some implementations, the platen 40 may be a cover plate, e.g., a cover glass or a lens glass for a display. Particularly when the ultrasonic transmitter 20 is in use, fingerprint detection and imaging can be performed through relatively thick platens if desired, e.g., 3 mm and above. However, for implementations in which the ultrasonic receiver 30 is configured for imaging fingerprints in a capacitance detection mode, a thinner and relatively more compliant platen 40 may be desirable. According to some such implementations, the platen 40 may include one or more polymers, such as one or more types of parylene, and may be substantially thinner. In some such implementations, the platen 40 may be tens of microns thick or even less than 10 microns thick.

Examples of piezoelectric materials that may be used to form the piezoelectric receiver layer 36 include piezoelectric polymers having appropriate acoustic properties, for example, an acoustic impedance between about 2.5 MRayls and 5 MRayls. Specific examples of piezoelectric materials that may be employed include ferroelectric polymers such as polyvinylidene fluoride (PVDF) and polyvinylidene fluoride-trifluoroethylene (PVDF-TrFE) copolymers. Examples of PVDF copolymers include 60:40 (molar percent) PVDF-TrFE, 70:30 PVDF-TrFE, 80:20 PVDF-TrFE, and 90:10 PVDR-TrFE. Other examples of piezoelectric materials that may be employed include polyvinylidene chloride (PVDC) homopolymers and copolymers, polytetrafluoroethylene (PTFE) homopolymers and copolymers, and diisopropylammonium bromide (DIPAB).

The thickness of each of the piezoelectric transmitter layer 22 and the piezoelectric receiver layer 36 may be selected so as to be suitable for generating and receiving ultrasonic waves. In one example, a PVDF planar piezoelectric transmitter layer 22 is approximately 28 µm thick and a PVDF-TrFE receiver layer 36 is approximately 12 µm thick. Example frequencies of the ultrasonic waves may be in the range of 5 MHz to 30 MHz, with wavelengths on the order of a millimeter or less.

Figure 5B:
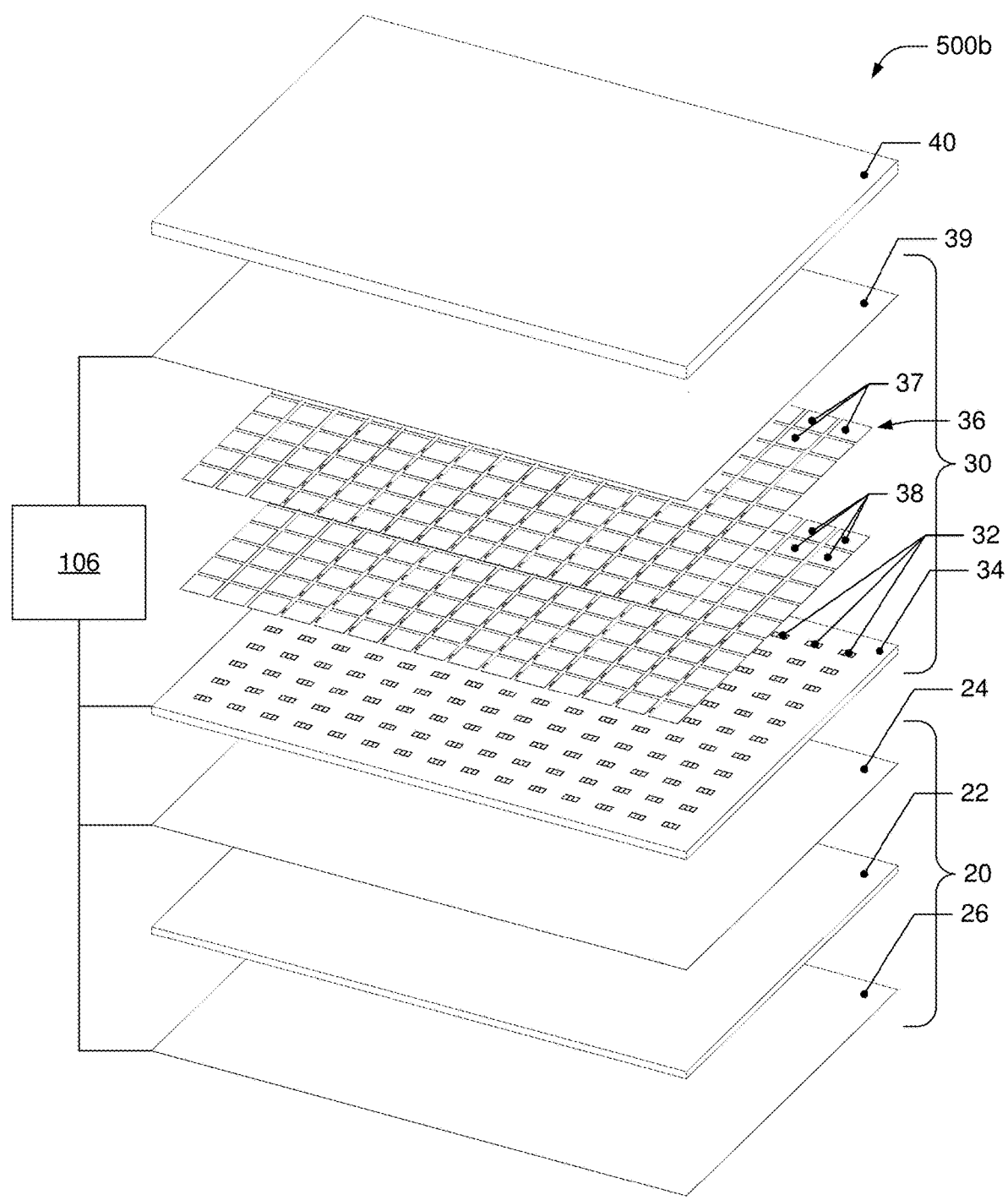

FIG. 5B shows an exploded view of an alternative example of an ultrasonic fingerprint sensor. In this example, the piezoelectric receiver layer 36 has been formed into discrete elements 37. In the implementation shown in FIG. 5B, each of the discrete elements 37 corresponds with a single pixel input electrode 38 and a single sensor pixel circuit 32. However, in alternative implementations of the ultrasonic fingerprint sensor 500b, there is not necessarily a one-to-one correspondence between each of the discrete elements 37, a single pixel input electrode 38 and a single sensor pixel circuit 32. For example, in some implementations there may be multiple pixel input electrodes 38 and sensor pixel circuits 32 for a single discrete element 37.

FIGS. 5A and 5B show example arrangements of ultrasonic transmitters and receivers in an ultrasonic fingerprint sensor, with other arrangements being possible. For example, in some implementations, the ultrasonic transmitter 20 may be above the ultrasonic receiver 30 and therefore closer to the object(s) to be detected. In some implementations, the ultrasonic transmitter may be included with the ultrasonic sensor array (e.g., a single-layer transmitter and receiver). In some implementations, the ultrasonic fingerprint sensor may include an acoustic delay layer. For example, an acoustic delay layer may be incorporated into the ultrasonic fingerprint sensor between the ultrasonic transmitter 20 and the ultrasonic receiver 30. An acoustic delay layer may be employed to adjust the ultrasonic pulse timing, and at the same time electrically insulate the ultrasonic receiver 30 from the ultrasonic transmitter 20. The acoustic delay layer may have a substantially uniform thickness, with the material used for the delay layer and/or the thickness of the delay layer selected to provide a desired delay in the time for reflected ultrasonic energy to reach the ultrasonic receiver 30. In doing so, the range of time during which an energy pulse that carries information about the object by virtue of having been reflected by the object may be made to arrive at the ultrasonic receiver 30 during a time range then it is unlikely that energy reflected from other parts of the ultrasonic fingerprint sensor is arriving at the ultrasonic receiver 30, In some implementations, the substrate 34 and/or the platen 40 may serve as an acoustic delay layer.

Figure 5C:
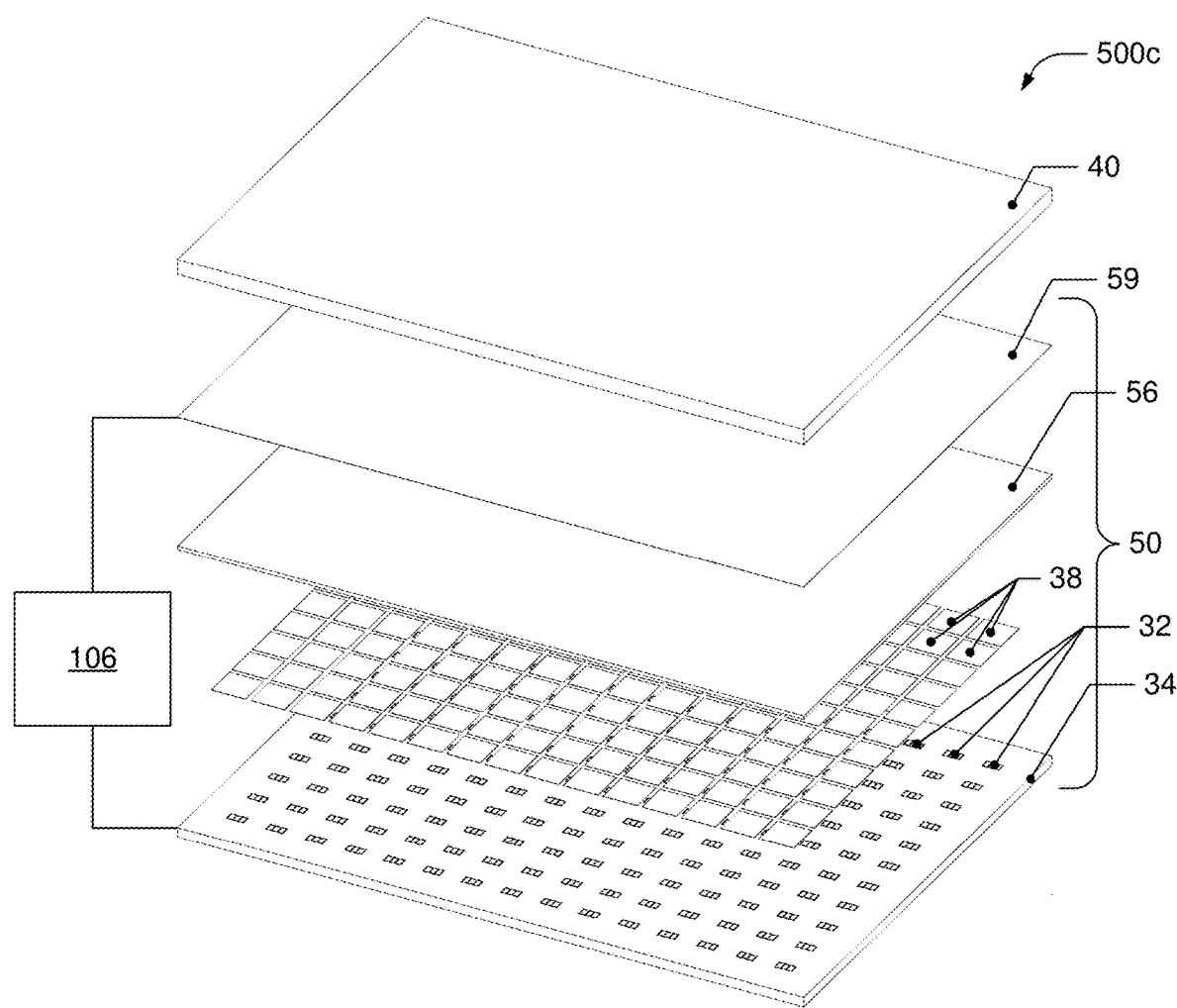
FIG. 5C shows an example of an ultrasonic transceiver array in an ultrasonic fingerprint sensor.

FIG. 5C shows an exploded view of an example of an ultrasonic fingerprint sensor. In this example, the ultrasonic fingerprint sensor 500c includes an ultrasonic transceiver array 50 under a platen 40. According to some implementations, the ultrasonic transceiver array 50 may serve as both the ultrasonic receiver 103 and the ultrasonic transmitter 105 that is shown in FIG. 1B and described above. The ultrasonic transceiver array 50 may include a substantially planar piezoelectric transceiver layer 56 configured for functioning as a plane wave generator. Ultrasonic waves may be generated by applying a voltage across the transceiver layer 56. The control system 106 may be configured for generating a transceiver excitation voltage that may be applied to the piezoelectric transceiver layer 56 via one or more underlying pixel input electrodes 38 or one or more overlying transceiver bias electrodes 59. The generated ultrasonic wave may travel towards a finger or other object to be detected, passing through the platen 40. A portion of the wave not absorbed or transmitted by the object may be reflected so as to pass back through the platen 40 and be received by the ultrasonic transceiver array 50.

The ultrasonic transceiver array 50 may include an array of sensor pixel circuits 32 disposed on a substrate 34. In some implementations, each sensor pixel circuit 32 may include one or more TFT- or silicon-based elements, electrical interconnect traces and, in some implementations, one or more additional circuit elements such as diodes, capacitors, and the like. Each sensor pixel circuit 32 may include a pixel input electrode 38 that electrically couples the piezoelectric transceiver layer 56 to the sensor pixel circuit 32.

In the illustrated implementation, the transceiver bias electrode 59 is disposed on a side of the piezoelectric transceiver layer 56 proximal to the platen 40. The transceiver bias electrode 59 may be a metallized electrode and may be grounded or biased to control which signals may be generated and which reflected signals may be passed to the array of sensor pixel circuits 32. Ultrasonic energy that is reflected from the exposed (top) surface of the platen 40 may be converted into surface charge by the piezoelectric transceiver layer 56. The generated surface charge may be coupled to the pixel input electrodes 38 and underlying sensor pixel circuits 32. The charge signal may be amplified or buffered by the sensor pixel circuits 32 and provided to the control system 106.

The control system 106 may be electrically connected (directly or indirectly) to the transceiver bias electrode 59 and the sensor pixel circuits 32 on the sensor substrate 34. In some implementations, the control system 106 may operate substantially as described above. For example, the control system 106 may be configured for processing the amplified signals received from the sensor pixel circuits 32.

The control system 106 may be configured for controlling the ultrasonic transceiver array 50 to obtain ultrasonic data, which may include fingerprint data. According to some implementations, the control system 106 may be configured for providing functionality such as that described herein, e.g., such as described herein.

In other examples of an ultrasonic fingerprint sensor with an ultrasonic transceiver array, a backside of the sensor substrate 34 may be attached directly or indirectly to an overlying platen 40. In operation, ultrasonic waves generated by the piezoelectric transceiver layer 56 may travel through the sensor substrate 34 and the platen 40, reflect off a surface of the platen 40, and travel back through the platen 40 and the sensor substrate 34 before being detected by sensor pixel circuits 32 on or in the substrate sensor 34.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the scope of this disclosure. Thus, the disclosure is not intended to be limited to the implementations shown herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

The invention claimed is:

1. An apparatus, comprising:
    a display;
    a fingerprint sensor having a fingerprint-sensing surface having a plurality of sub-regions; and
    a control system, the control system configured to:
        (a) prompt, via at least one visual notification on the display, a user to place their finger within a given sub-region of the plurality of sub-regions of the fingerprint-sensing surface;
        (b) obtain, using the fingerprint sensor, a fingerprint of the user from the given sub-region of the fingerprint-sensing surface;
        (c) obtain a log of historical touch locations, each historical touch location indicating a location or area within the fingerprint-sensing surface at which a respective previous touch input was received by the fingerprint sensor and/or the touch sensor since a reset operation; and
        (d) identify, based on the log, the given sub-region of the fingerprint-sensing surface, wherein the log indicates that no previous touch inputs were obtained since the reset operation from within the given sub-region.

2. The apparatus of claim 1, wherein the control system is further configured to:
    (c) obtain a log of historical fingerprint locations, each historical fingerprint location indicating a location or area within the fingerprint-sensing surface at which a respective previous fingerprint image was obtained since a reset operation; and
    (d) identify, based on the log, the given sub-region of the fingerprint-sensing surface, wherein the log indicates that no previous fingerprint images were obtained since the reset operation from within the given sub-region.

3. The apparatus of claim 2, wherein the control system is further configured to (e) determine, based on the log, that more than a predetermined fraction of the fingerprint-sensing surface has been used to obtain fingerprint images since the reset operation; and
    (f) perform the reset operation, based on the determination in (e), by prompting, via one or more visual notifications on the display, a user to wipe at least some portion of the fingerprint-sensing surface.

4. The apparatus of claim 2, wherein the control system is further configured to add the given sub-region to the log of historical fingerprint locations.

5. The apparatus of claim 1, wherein the control system is further configured to randomly or pseudo-randomly select the given sub-region from the plurality of sub-regions of the fingerprint-sensing surface.

6. The apparatus of claim 1, wherein the control system is further configured to identify a first location or first area of the fingerprint-sensing surface, wherein the first location or first area is associated with an ending location or ending area for at least one previous fingerprint image and wherein the control system is configured to prompt the user to place their finger within the given sub-region by prompting the user, via at least one visual notification on the display, to slide at least one finger across the first location or first area and end the slide of the at least one finger at a second location or second area distinct from the first location or first area.

7. A method of securing biometric information, the method comprising:
prompting, using at least one visual notification on a display, a user to place their finger within a given sub-region of a plurality of sub-regions of a fingerprint-sensing surface; and
obtaining, using a fingerprint sensor associated with the fingerprint-sensing surface, a fingerprint of the user from the given sub-region of the fingerprint-sensing surface;
obtaining a log of historical fingerprint locations, each historical fingerprint location indicating a location or area within the fingerprint-sensing surface at which a respective previous fingerprint image was obtained since a reset operation; and
selecting, based on the log, the given sub-region of the fingerprint-sensing surface, wherein the log indicates that no previous fingerprint images were obtained since the reset operation from within the given sub-region.

8. The method of claim 7, further comprising:
making a determination, based on the log, that more than a predetermined fraction of the fingerprint-sensing surface has been used to obtain fingerprint images since the reset operation; and
performing the reset operation, based on the determination, by prompting, via one or more visual notifications on the display, a user to wipe at least some portion of the fingerprint-sensing surface.

9. The method of claim 7, further comprising adding the given sub-region to the log of historical fingerprint locations.

10. The method of claim 7, further comprising:
obtaining a log of historical touch locations, each historical touch location indicating a location or area within the fingerprint-sensing surface at which a respective previous touch input was received by the fingerprint sensor and/or by a touch sensor since a reset operation; and
identifying, based on the log, the given sub-region of the fingerprint-sensing surface, wherein the log indicates that no previous touch inputs were obtained since the reset operation from within the given sub-region.

11. The method of claim 7, further comprising randomly or pseudo-randomly selecting the given sub-region from the plurality of sub-regions of the fingerprint-sensing surface.

12. The method of claim 7, further comprising:
identifying a first location or first area of the fingerprint-sensing surface, wherein the first location or first area is associated with an ending location or ending area for at least one previous fingerprint image and wherein prompting the user to place their finger within the given sub-region comprises prompting the user, via at least one visual notification on the display, to slide at least one finger across the first location or first area and end the slide of the at least one finger at a second location or second area distinct from the first location or first area.

13. An apparatus, comprising:
a display;
a fingerprint sensor having a fingerprint-sensing surface; and
a control system, the control system configured to:
(a) obtain a log of historical fingerprint locations, each historical fingerprint location indicating a location or area within the fingerprint-sensing surface at which a respective previous fingerprint image was obtained since a reset operation;
(b) determine, based on the log, that more than a predetermined fraction of the fingerprint-sensing surface has been used to obtain fingerprint images since the reset operation;
(c) perform the reset operation, based on the determination in (ii), by prompting, via one or more visual notifications on the display, a user to wipe the fingerprint-sensing surface.

14. The apparatus of claim 13, wherein the fingerprint sensor has touch sensor functionality and/or the apparatus further comprises a touch sensor and wherein the control system is further configured to:
(d) obtain a log of historical touch locations, each historical touch location indicating a location or area within the fingerprint-sensing surface at which a respective previous touch input was received by the fingerprint sensor and/or the touch sensor since the reset operation;
(e) determine, based on the log, that more than a predetermined fraction of the fingerprint-sensing surface has been used to receive at least one touch input since the reset operation; and
(c) perform the reset operation, based on the determination in (e), by prompting, via one or more visual notifications on the display, the user to wipe the fingerprint-sensing surface.

15. The apparatus of claim 13, wherein the control system is further configured to:
(d) prompt, via at least one visual notification on the display, a user to place their finger within a given sub-region of the plurality of sub-regions of the fingerprint-sensing surface; and
(e) obtain, using the fingerprint sensor, a fingerprint of the user from the given sub-region of the fingerprint-sensing surface.

16. An apparatus, comprising:
a display means;
a fingerprint sensor means having a fingerprint-sensing surface having a plurality of sub-regions; and
control system means, the control system means configured to:
(a) prompt, via at least one visual notification on the display means, a user to place their finger within a given sub-region of the plurality of sub-regions of the fingerprint-sensing surface;
(b) obtain, using the fingerprint sensor means, a fingerprint of the user from the given sub-region of the fingerprint-sensing surface;
(c) obtain a log of historical fingerprint locations, each historical fingerprint location indicating a location or area within the fingerprint-sensing surface at which a respective previous fingerprint image was obtained since a reset operation; and (d) identify, based on the log, the given sub-region of the fingerprint-sensing surface, wherein the log indicates that no previous fingerprint images were obtained since the reset operation from within the given sub-region.

17. The apparatus of claim 16, wherein the control system means are further configured to randomly or pseudo-randomly select the given sub-region from the plurality of sub-regions of the fingerprint-sensing surface.

18. The apparatus of claim 16, wherein the control system means are further configured to select the given sub-region from the plurality of sub-regions of the fingerprint-sensing surface based on information in a log of historical fingerprint locations.

19. An apparatus, comprising:
a display;
a fingerprint sensor having a fingerprint-sensing surface;
a touch sensor; and
a control system, the control system configured to:
  (a) obtain a log of historical touch locations, each historical touch location indicating a location or area within the fingerprint-sensing surface at which a respective previous touch input was received by the touch sensor since the reset operation;
  (b) determine, based on the log, that more than a predetermined fraction of the fingerprint-sensing surface has been used to receive at least one touch input since the reset operation; and
  (c) perform the reset operation, based on the determination in (e), by prompting, via one or more visual notifications on the display, the user to wipe the fingerprint-sensing surface.

20. An apparatus, comprising:
a display;
a fingerprint sensor having a fingerprint-sensing surface having a plurality of sub-regions; and
a control system, the control system configured to:
  (a) prompt, via at least one visual notification on the display, a user to place their finger within a given sub-region of the plurality of sub-regions of the fingerprint-sensing surface;
  (b) obtain, using the fingerprint sensor, a fingerprint of the user from the given sub-region of the fingerprint-sensing surface;
  (c) identify a first location or first area of the fingerprint-sensing surface, the first location or first area being associated with an ending location or ending area for at least one previous fingerprint image; and
  (d) prompt the user to place their finger within the given sub-region by prompting the user, via at least one visual notification on the display, to slide at least one finger across the first location or first area and end the slide of the at least one finger at a second location or second area distinct from the first location or first area.

* * * * *